US012627072B2

(12) United States Patent
Sekiya et al.

(10) Patent No.: US 12,627,072 B2
(45) Date of Patent: May 12, 2026

(54) VEHICLE WIRELESS DEVICE

(71) Applicant: DENSO CORPORATION, Kariya-city (JP)

(72) Inventors: Youhei Sekiya, Nisshin-city (JP); Kenichiro Sanji, Kariya-city (JP); Takashi Saiki, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 124 days.

(21) Appl. No.: 18/513,091

(22) Filed: Nov. 17, 2023

(65) Prior Publication Data

US 2024/0088573 A1 Mar. 14, 2024

Related U.S. Application Data

(63) Continuation of application No. PCT/JP2022/023136, filed on Jun. 8, 2022.

(30) Foreign Application Priority Data

Jun. 22, 2021 (JP) ................................ 2021-103500

(51) Int. Cl.

*H01Q 21/06* (2006.01)
*H01Q 1/32* (2006.01)
*H01Q 1/42* (2006.01)

(52) U.S. Cl.

CPC ............. *H01Q 21/062* (2013.01); *H01Q 1/32* (2013.01); *H01Q 1/42* (2013.01); *H01Q 21/065* (2013.01)

(58) Field of Classification Search

None

See application file for complete search history.

(56) References Cited

U.S. PATENT DOCUMENTS

| | | | |
|---|---|---|---|
| 5,315,303 | A | 5/1994 | Tsou et al. |
| 5,508,706 | A | 4/1996 | Tsou et al. |
| 5,512,901 | A | 4/1996 | Chen et al. |
| 6,292,154 | B1 | 9/2001 | Deguchi et al. |

(Continued)

FOREIGN PATENT DOCUMENTS

| | | | |
|---|---|---|---|
| JP | H07-104052 | A | 4/1995 |
| JP | 2000022431 | A | 1/2000 |

(Continued)

*Primary Examiner* — Crystal L Hammond

(74) *Attorney, Agent, or Firm* — Harness, Dickey & Pierce, P.L.C.

(57) ABSTRACT

A vehicle wireless device is used in a state being attached to an attachment surface of a vehicle. A circuit board includes a circuit that transmits or receives a radio wave at a predetermined target frequency. An antenna includes a board parallel portion parallel to the circuit board to receive a horizontally polarized wave having a vibration direction of an electric field parallel to the circuit board. A case accommodates the circuit board and the antenna. The circuit board faces the attachment surface when the vehicle wireless device is attached to the attachment surface. The circuit board may have a board region overlapping the board parallel portion without a conductor plate being provided in the board region. An inner space of the case may have a case region extending by λ/4 downward from the board parallel portion without a conductor plate being provided in the case region.

10 Claims, 10 Drawing Sheets

(56) References Cited

U.S. PATENT DOCUMENTS

| | | | | |
|---|---|---|---|---|
| 6,448,931 | B1 | 9/2002 | Deguchi et al. | |
| 6,518,932 | B1 | 2/2003 | Matsui et al. | |
| 2006/0220977 | A1* | 10/2006 | Ogino | H01Q 7/00 343/866 |
| 2020/0295436 | A1* | 9/2020 | Ueda | H01Q 21/065 |

FOREIGN PATENT DOCUMENTS

| | | | |
|---|---|---|---|
| JP | 2001156544 | A | 6/2001 |
| JP | 2006311497 | A | 11/2006 |
| JP | 2012172334 | A | 9/2012 |
| JP | 2015035644 | A | 2/2015 |
| WO | 2000/48269 | A1 | 8/2000 |
| WO | WO-2014181564 | A1 | 11/2014 |

* cited by examiner

VEHICLE WIRELESS DEVICE

CROSS REFERENCE TO RELATED APPLICATIONS

The present application is a continuation application of International Patent Application No. PCT/JP2022/023136 filed on Jun. 8, 2022, which designated the U.S. and claims the benefit of priority from Japanese Patent Application No. 2021-103500 filed on Jun. 22, 2021.

TECHNICAL FIELD

The present disclosure relates to a vehicle wireless device for wireless communication with an external device.

BACKGROUND

A system performs wireless communication between a mobile device and a vehicle using a radio wave, and determines whether the mobile device is present in a vehicle compartment based on reception statuses of signals from the mobile device in multiple in-vehicle antennas.

SUMMARY

According to at least one embodiment of the present disclosure, a vehicle wireless device is configured to be attached to an attachment surface of a vehicle. The device includes a circuit board, a horizontally polarized wave antenna and a case accommodating the circuit board and the antenna.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
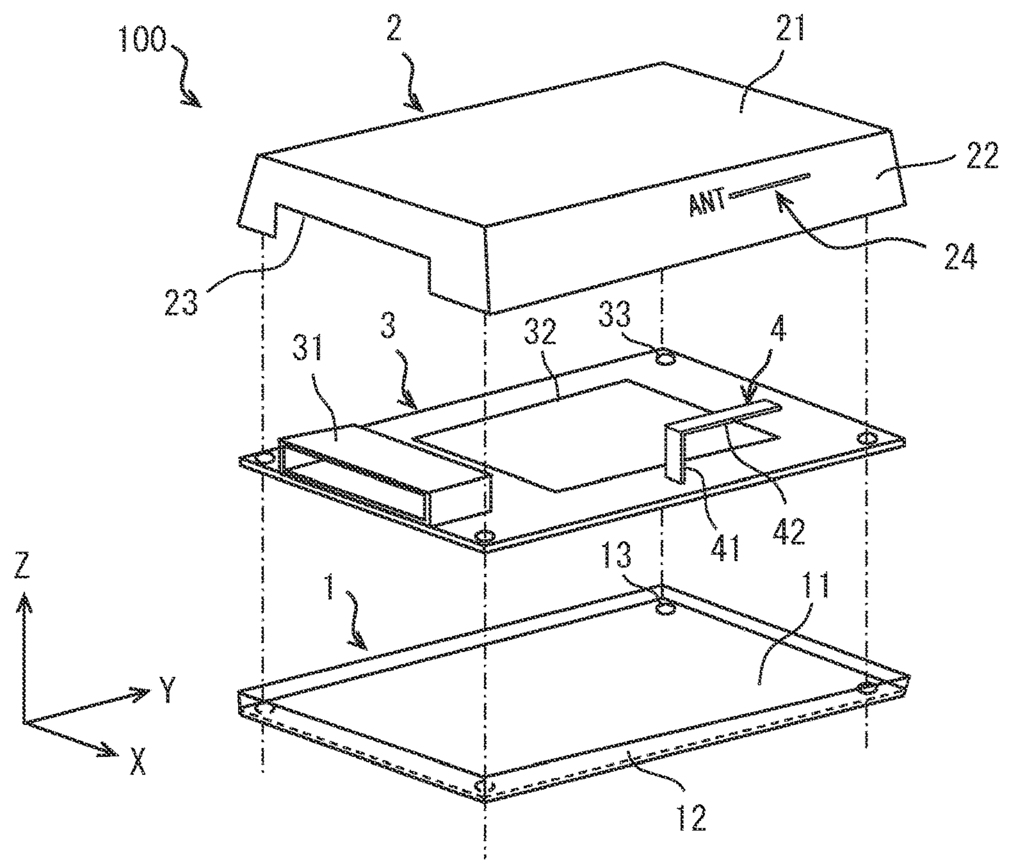
FIG. 1 is an exploded perspective view of a vehicle wireless device.

To begin with, examples of relevant techniques will be described. A vehicle wireless device is a device for wireless communication with an external device, such as a mobile terminal carried by a user or other vehicles.

According to a comparative example, a system performs wireless communication between a mobile device and a vehicle using a radio wave of 2.45 GHz or the like, and determines whether the mobile device is present in a vehicle compartment based on reception statuses of signals from the mobile device in multiple in-vehicle antennas.

A reception state (for example, a reception strength) of a signal from a mobile terminal carried by a user can be used for detecting approach of the user to the vehicle or estimating a position of the user relative to the vehicle. In view of such usages, when the user is in the vicinity of the vehicle, it may be preferable that the vehicle wireless device can satisfactorily communicate with the mobile terminal regardless of a position and direction of the user relative to the vehicle.

However, a high-frequency radio wave of 700 MHz or more, such as a radio wave in 2.4 GHz band, travels straighter than a radio wave of 300 kHz or less in a low-frequency (LF) band, and the high-frequency radio wave is less likely to wrap around a metal portion of a vehicle body.

For example, when the vehicle wireless device is attached to an interior-side surface of a pillar, the vehicle wireless device is less likely to allow a direct wave to wrap around the pillar toward a vehicle exterior. In particular, a linearly polarized wave having a vibration direction of an electric field parallel to a metal surface tends to be easily bounced off the metal portion. For example, when an antenna is attached to the metal portion as an attachment object and transmits a polarized wave having a vibration direction of an electric field parallel to the metal surface, a back side of the attachment object is likely to be outside of a reachable range. The reachable range corresponds to a range in which a direct wave can propagate, and a range outside the reachable range corresponds to a range in which the direct wave cannot propagate. The reachable range also includes a region in which the direct wave propagates due to diffraction, in other words, due to wrapping around.

Even when the mobile terminal is in the range outside the reachable range of the vehicle wireless device, the vehicle wireless device can receive a signal from the mobile terminal due to reflection from other structures. However, when a reflected wave is used to estimate a position of the mobile terminal, a possibility of erroneously estimating a distance to the mobile terminal or a direction to the mobile terminal increases.

When the reachable range of the vehicle wireless device is individually narrow, in order to accurately determine the position of the user (in other words, a mobile device), it is required to increase the number of vehicle wireless devices to cover ranges outside the respective reachable ranges. However, as the number of vehicle wireless devices to be disposed increases, costs of the system may be increased.

In contrast, according to the present disclosure, a vehicle wireless device can form a wide communication range.

According to an aspect of the present disclosure, a vehicle wireless device is configured to be attached to an attachment surface of a vehicle. The device includes a circuit board, a horizontally polarized wave antenna and a case. The circuit board includes a dielectric and a circuit configured to transmit or receive a radio wave at a predetermined target frequency of 700 MHz or more. The horizontally polarized wave antenna is configured to receive the radio wave and includes a board parallel portion parallel to the circuit board to receive a board horizontally polarized wave having a vibration direction of an electric field parallel to the circuit board. The case accommodates the circuit board and the horizontally polarized wave antenna. The circuit board is arranged such that the circuit board faces the attachment surface of the vehicle when the vehicle wireless device is attached to the attachment surface. The circuit board has a board region overlapping the board parallel portion without a ground portion being formed in the board region, and the ground portion is a conductor plate configured to provide a ground potential for the circuit.

In general, a conductor plate acts as a reflector that is an object reflecting radio waves. Since the ground portion is a plate-shaped conductor, the ground portion also acts as the reflector. According to the above configuration, since the ground portion that can act as the reflector is not present in the region overlapping the board parallel portion, an influence of reflection by the ground portion can be weakened as compared with a case in which the ground portion is provided immediately below the board parallel portion. Since the ground portion is not formed immediately below the board parallel portion, the radio waves radiated from the board parallel portion can freely propagate in the region below the board parallel portion. As a result, a communication range can be widened.

According to another aspect of the present disclosure, a vehicle wireless device is configured to be attached to an attachment surface of a vehicle. The device includes a circuit board, a horizontally polarized wave antenna and a case. The circuit board includes a circuit configured to transmit or receive a radio wave at a predetermined target frequency of 700 MHz or more. The horizontally polarized wave antenna is configured to receive the radio wave and includes a board parallel portion parallel to the circuit board to receive a board horizontally polarized wave having a vibration direction of an electric field parallel to the circuit board. The case accommodates the circuit board and the horizontally polarized wave antenna. The circuit board is arranged such that the circuit board faces the attachment surface of the vehicle when the vehicle wireless device is attached to the attachment surface. The bottom of the case is made of metal. The board parallel portion is disposed above the bottom of the case and at an electrical distance of $\lambda/4$ or more from the bottom of the case, and A is a wavelength of the radio wave. An inner space of the case has a case region overlapping the board parallel portion and extending by $\lambda/4$ downward from the board parallel portion without a conductor plate being provided in the case region to face the board parallel portion.

According to the above configuration, the conductor plate that can act as the reflector is not present in the case region extending by $\lambda/4$ downward from the board parallel portion. Therefore, the radio waves radiated from the board parallel portion can propagate in various directions through the case region below the board parallel portion. As a result, a communication area can be widened.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

The expression "parallel" in the present disclosure is not limited to a completely parallel state. An inclination of several degrees to about 15 degrees may also be included. That is, the expression may include an approximately parallel state (so-called substantially parallel state). The expression "vertical" in the present disclosure is not limited to a completely vertical state, and also includes an aspect of being inclined by several degrees to about 15 degrees. The expression face in the present disclosure refers to a state of facing each other at a predetermined interval. A facing state also includes a state in which members substantially face each other, such as an aspect in which the members face each other while inclined by about 15 degrees.

A vehicle wireless device 100 is a device for performing wireless communication with a communication device (hereinafter, referred to as a mobile terminal) carried by a user of a vehicle. Examples of the mobile terminal include a smartphone. The vehicle wireless device 100 is used by being connected to a smart ECU (not illustrated). An ECU is an abbreviation for electronic control unit and means an electronic control device. For example, the vehicle wireless device 100 reports a reception status of a radio signal from the mobile terminal to the smart ECU, as information indicating a position of the mobile terminal. The reception status can include a reception strength, a signal round-trip flight time, a phase difference, or the like.

The vehicle wireless device 100 may be disposed at multiple locations of the vehicle. For example, the vehicle wireless device 100 may be disposed on an outer door handle for a driver's seat, an outer door handle for a front passenger seat, an inner side surface of a C pillar on the left, and an inner side surface of a C pillar on the right. As described above, the vehicle wireless device 100 outputs, to the smart ECU, a signal indicating a reception status such as a reception strength as an index of the position of the mobile terminal.

The smart ECU is an ECU that implements a passive entry and passive start system (hereinafter referred to as a PEPS system) by performing wireless communication with a mobile terminal via the vehicle wireless device 100. The PEPS system is a system that executes vehicle control according to the position of the mobile terminal. The smart ECU determines the position of the mobile terminal with respect to the vehicle based on, for example, the reception strength of the signal from the mobile terminal received from multiple vehicle wireless devices 100 that are mounted on the vehicle. Then, the smart ECU executes control such as locking or unlocking a door under a condition that the mobile terminal can be checked to be present in the vicinity of a door of the vehicle by wireless communication with the mobile terminal. When the mobile terminal can be checked to be present in a vehicle compartment by wireless communication with the mobile terminal, the smart ECU starts a travel driving source based on a user operation on a start button (not illustrated). The PEPS system may also be referred to as a smart entry system or a vehicle electronic key system.

FIG. 1 is a view illustrating an example of a schematic configuration of the vehicle wireless device 100 according to the present disclosure. As illustrated in FIG. 1, the vehicle wireless device 100 includes a lower case 1, an upper case 2, a circuit board 3, and an antenna 4. The upper case 2 is combined with the lower case 1 as a whole to form a flat rectangular parallelepiped case (in other words, a housing) having a direction perpendicular to the circuit board 3 as a thickness direction. That is, the vehicle wireless device 100 has a flat rectangular parallelepiped outer shape as a whole. The circuit board 3 is also formed in a substantially rectangular shape to correspond to the above shape. The antenna 4 is provided on the circuit board 3 as an example.

The vehicle wireless device 100 is used by being attached to a predetermined position of a vehicle body. For example, the vehicle wireless device 100 is attached to a vehicle interior-side surface of a metal portion of a vehicle body that is close to a window portion 210 such as a B pillar or a C pillar. The pillar refers to a pillar that supports a roof, the B pillar refers to a second pillar from front, and the C pillar refers to a third pillar from the front. The vehicle wireless device 100 may be attached to the interior-side surface of the metal portion of vehicle body, or may be attached to an exterior-side surface of the metal portion of vehicle body. The vehicle wireless device 100 is attached, for example, within 10 cm from a window frame of a side window for a rear seat, in a posture in which a board parallel portion to be described later is parallel to the nearest window frame.

In another aspect, the vehicle wireless device 100 may be configured on the premise of being disposed, for example, in the vicinity of a bumper, a door handle, a roof, a back or side mirror, or a trunk door handle. The vehicle wireless device 100 is attached so that a part of or the entire circuit board 3 faces an attachment target portion 200 that serves as the metal portion of the vehicle body corresponding to an attachment destination. The attachment target portion 200 is determined in advance based on a request from, for example, a vehicle manufacturer. An attachment posture of the vehicle wireless device 100 on the attachment target portion 200 is also set in advance. A surface of the metal portion serving as the attachment target portion 200 corresponds to an attachment surface.

Hereinafter, a direction orthogonal to the circuit board 3 is referred to as a vertical direction. For the vehicle wireless device 100, a direction from the circuit board 3 toward the lower case 1 corresponds to a downward direction, and a direction from the circuit board 3 toward the upper case 2 corresponds to an upward direction. The upward direction corresponds to a direction from a lower surface, which is a surface facing the attachment target portion 200, toward an upper surface as an opposite surface, of two surfaces of the circuit board 3.

Hereinafter, the configuration of the vehicle wireless device 100 will be described by introducing a concept of a right-handed three-dimensional coordinate system having an X-axis, a Y-axis, and a Z-axis orthogonal to one another. The X-axis, the Y-axis, and the Z-axis illustrated in various drawings such as FIG. 1 represent a short direction of the circuit board 3, a longitudinal direction of the circuit board 3, and the vertical direction, respectively. In another aspect, when the circuit board 3 has a square shape, a direction along any one side can be set as the X-axis.

The three-dimensional coordinate system including the X-axis, the Y-axis, and the Z-axis is a concept for illustrating the configuration of the vehicle wireless device 100. In a state in which the vehicle wireless device 100 is attached to the vehicle interior-side surface of the C pillar and the like, for example, the X-axis corresponds to a vehicle front-rear direction, the Y-axis corresponds to a vehicle vertical direction, and the Z-axis corresponds to a vehicle width direction. A Z-axis positive direction, that is, an upper side of the vehicle wireless device 100 can correspond to a direction from the attachment target portion 200 toward the vehicle compartment.

The circuit board 3 is a substantially rectangular plate-shaped member formed by mounting various electronic components on a printed circuit board. A multilayer substrate in which multiple conductor layers are built up based on an insulating layer such as a glass epoxy substrate (in other words, flame retardant type 4 (FR4)) as the printed circuit board can be adopted. As an example, the circuit board 3 is implemented using a glass epoxy resin having a relative dielectric constant of about 4.3 to 4.9. The circuit board 3 is a single-sided board or a double-sided board not including an internal conductor layer. The circuit board 3 may be implemented using, for example, a multilayer substrate including an internal conductor layer.

At four corners of the circuit board 3, screw holes 33 for screwing the circuit board 3 to the lower case 1 and the upper case 2 are provided. Positions of the screw holes 33 can be appropriately changed, and may be positions in the lower case 1, the upper case 2, and the circuit board 3 while corresponding to each other. The positions corresponding to each other correspond to positions overlapping each other in a top view. The screw holes 33, in other words, fixing portions for fixing the circuit board 3 to the lower case 1 or the upper case 2 may be provided at four or more locations. As a method for maintaining a state in which the lower case 1, the upper case 2, and the circuit board 3 are combined, various locking structures such as snap fit can be adopted in addition to screwing.

Figure 2:
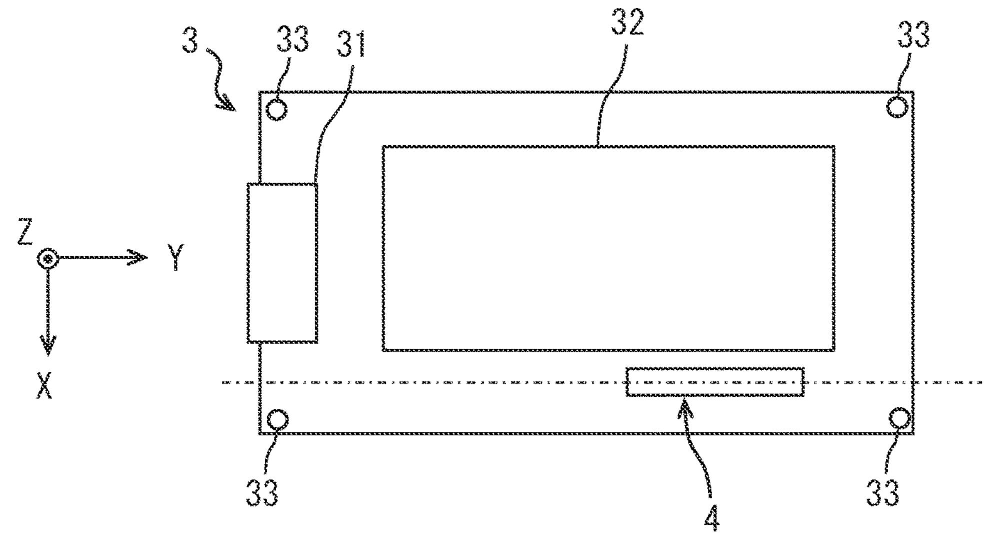
FIG. 2 is a view illustrating an example of an arrangement mode of various components on a circuit board.

As illustrated in FIG. 2, the antenna 4, a connector 31, and a control circuit 32 are provided on the upper surface of the circuit board 3. The connector 31 is a component to which various cables, such as a power supply cable and a communication cable in communication with the smart ECU, are connected. As an example, the connector 31 is attached to an end portion of the circuit board 3 on a Y-axis negative direction side.

The control circuit 32 is a circuit module that controls an operation of the vehicle wireless device 100, and includes electronic components such as an IC. For example, the control circuit 32 includes a transmission and reception circuit and a power supply circuit. The transmission and reception circuit is a circuit module that performs signal processing related to at least one of signal transmission and signal reception. The transmission and reception circuit performs at least one of modulation, demodulation, frequency conversion, amplification, digital-to-analog conversion, and detection. The power supply circuit is a circuit module that converts a voltage received from a power supply cable into a predetermined voltage suitable for an operation of the transmission and reception circuit, and outputs the predetermined voltage.

The antenna 4 is an antenna for transmitting and receiving radio waves in a frequency band used in short-range wireless communication, such as Bluetooth low energy (Bluetooth is a registered trademark) or Wi-Fi (registered trademark). For example, the antenna 4 can transmit and receive radio waves having a frequency belonging to a band from 2400 MHz to 2500 MHz (hereinafter, a 2.4 GHz band). A target frequency that is an operation frequency of the antenna 4 is an example, and is not limited to the 2.4 GHz band. A target frequency band may be any one of a 700 MHz band, an 800 MHz band, a 900 MHz band, a 1.5 GHz band, a 1.7 GHz band, a 2 GHz band, a 2.5 GHz band, or less a 3.4 GHz band, a 3.7 GHz band, a 4.5 GHz band, a 5 GHz band, and a 28 GHz band.

The antenna 4 is configured to transmit and receive radio waves having a predetermined target frequency. Of course, the vehicle wireless device 100 in another aspect may be used for only transmission or reception. That is, the antenna 4 may be a transmission-reception combined antenna or a reception-dedicated antenna. In the present disclosure, the expression "an antenna for transmitting and receiving a radio signal in a certain frequency band" may include not only an antenna used for both transmission and reception but also an antenna only used for reception. That is, the expression "transmission and reception" can be understood as at least one of transmission and reception and reception. The same also applies to description of the transmission and reception circuit and the like. Since there is reversibility between transmission and reception of radio waves as operations of an antenna, an antenna capable of receiving certain radio waves can be regarded as an antenna capable of transmitting the radio waves.

In addition, an application of the antenna 4 is not limited to short-range communication. The antenna 4 may be an antenna for transmitting and receiving a radio wave (in other words, a radio signal) in a frequency band used in cellular communication. That is, the antenna may be an antenna for performing data communication with a wireless base station constituting a 4G or 5G mobile communication system.

Hereinafter, "λ" represents a wavelength of a radio wave having a target frequency (hereinafter, also referred to as a target wavelength). For example, "λ/2" and "0.5λ" indicate half the length of the target wavelength, and "λ/4" and "0.25λ" indicate a quarter of the length of the target wavelength. The wavelength (that is, λ) of a radio wave of 2.4 GHz in vacuum and air is 125 mm. In an example of dimensions of members constituting the vehicle wireless device 100, an expression using λ can be understood as an electric length. The electric length is an effective length in consideration of a fringing electric field, a wavelength shortening effect of a dielectric, and the like. The electric length may also be referred to as an effective length. Of course, λ can be understood as a length in vacuum or air for a portion that is not subjected to the wavelength shortening effect or the like. For example, when the circuit board 3 is provided using a dielectric having a relative dielectric constant of 4.3, λ in the circuit board 3 is theoretically about 60 mm due to the wavelength shortening effect of the dielectric. Therefore, a dielectric plate having a relative dielectric constant of 4.3 and a thickness of 15 mm corresponds to a member having an electrical thickness of λ/4.

The antenna 4 is, for example, a three-dimensional inverted-L antenna standing from a board surface. That is, the antenna 4 has a three-dimensional shape. Specifically, the antenna 4 includes an upright portion 41 standing from the circuit board 3 and a board parallel portion 42 parallel to a surface of the circuit board 3. Both the upright portion 41 and the board parallel portion 42 are predetermined linear conductors, and the expression "linear that an upper end portion of the upright portion 41 is connected to one end of the board parallel portion 42" also includes a shape having a certain width or thickness. For example, the expression "linear" also includes a strip shape or a rod shape whose width or thickness is sufficiently smaller than a length thereof in the longitudinal direction.

The other end (lower end portion) of the upright portion 41 is electrically connected to a signal terminal of the transmission and reception circuit. That is, a feeding point is provided at the lower end portion of the upright portion 41. The feeding point is a portion at which the signal terminal of the transmission and reception circuit and the antenna 4 serving as a radiation element are electrically connected to each other via a wiring pattern including, for example, a microstrip line. The feeding point can be regarded as a connection point with the transmission and reception circuit or a feeder line.

The antenna 4 can be held in a posture with respect to the board surface using, for example, a solder or a connector. The antenna 4 may be configured to maintain the posture with respect to the circuit board 3 by inserting a pin-shaped insertion portion provided at the lower end portion of the upright portion 41 into a through hole formed in the circuit board 3.

Figure 3:
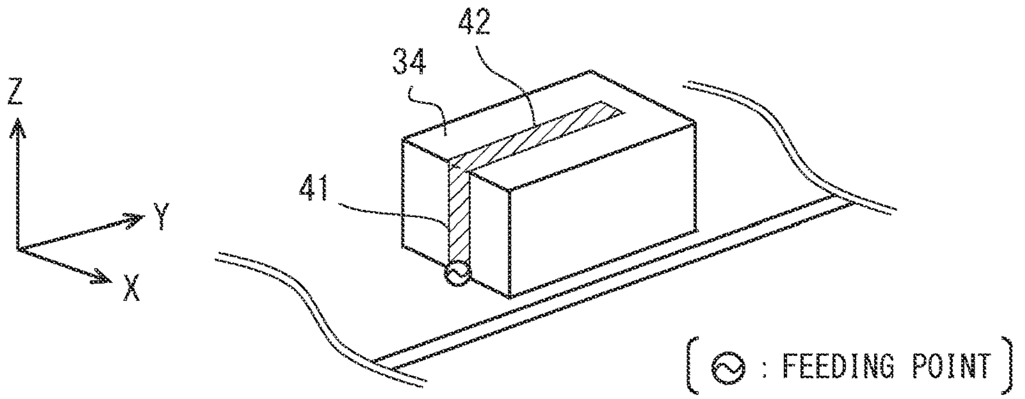
FIG. 3 is a view illustrating an example of a method for implementing a three-dimensional antenna.

The antenna 4 corresponds to a configuration in which a monopole of λ/4 is bent at a right angle. The inverted-L antenna serving as the antenna 4 is implemented by bending a linear (strip-shaped) sheet metal. As illustrated in FIG. 3, the inverted-L antenna serving as the antenna 4 may be patterned on a surface of a rectangular parallelepiped or plate-shaped support portion 34 which is made of a dielectric material having a relative dielectric constant equal to or greater than a predetermined value. The support portion 34 may be formed integrally with the circuit board 3. Such a support portion 34 can also be referred to as a step portion. The support portion 34 may be a separately manufactured dielectric block or plate. The support portion 34 may be a member assembled to the surface of the circuit board 3. The support portion 34 may be fixed to the surface of the circuit board 3. The support portion 34 preferably has a high relative dielectric constant from the viewpoint of restricting a height (thickness) of the device due to the wavelength shortening effect. Examples of a method for patterning the antenna 4 on the surface of the support portion 34 can include electroplating, metal deposition, and coating of conductive paint. A conductor pattern corresponding to the board parallel portion 42 may be formed inside the support portion 34.

When a total length of the upright portion 41 and the board parallel portion 42 is set to be an electrical length of λ/4, the antenna 4 is excited at the target frequency. A current component flowing through the upright portion 41 contributes to radiation of a board vertically polarized wave serving as a linearly polarized wave in which a vibration direction of an electric field is perpendicular to the circuit board 3. The current component flowing through the board parallel portion 42 contributes to radiation of a board horizontally polarized wave serving as a linearly polarized wave in which the vibration direction of the electric field is parallel to the circuit board 3. That is, when being an inverted-L antenna, the antenna 4 functions as an antenna capable of transmitting and receiving each of the board vertically polarized wave and the board horizontally polarized wave.

Since the upright portion 41 corresponds to a part of a monopole antenna, a gain of the board vertically polarized wave is substantially uniform in all directions orthogonal to the upright portion 41. That is, there is omni-directivity in an XY-plane. The board parallel portion 42 also has radiation characteristics similar to those of the monopole antenna. Specifically, the board horizontally polarized wave can be radiated in all directions including Z-axis positive and negative directions and directions orthogonal to the board parallel portion 42. Although characteristics of the antenna 4 have been described from the viewpoint of a time when radio waves are radiated, gain characteristics at the time of radio wave reception are also the same as the radiation characteristics based on the reversibility between transmission and reception. Hereinafter, an antenna capable of transmitting and receiving the board horizontally polarized wave is also referred to as a horizontally polarized wave antenna 4*x*. The antenna 4 including the board parallel portion 42 corresponds to the horizontally polarized wave antenna 4*x*. An antenna capable of transmitting and receiving the board vertically polarized wave is also referred to as a vertically polarized wave antenna.

A gain ratio between the board vertically polarized wave and the board horizontally polarized wave is derived from an aspect ratio of an L-shaped element, that is, a ratio of a length of the upright portion 41 to a length of the board parallel portion 42. When the board parallel portion 42 is made longer, a gain of the board horizontally polarized wave is increased. Therefore, the length of the board parallel portion 42 is preferably set to be equal to or greater than the length of the upright portion 41. For example, the ratio of the length of the upright portion 41 to the length of the board parallel portion 42 is set to be 1:3, 1:2, 2:3, 3:4, 1:1, or the like. Of course, in another aspect, the board parallel portion 42 may be set to be shorter than the upright portion 41. For example, the ratio of the length of the upright portion 41 to the length of the board parallel portion 42 may be set to be 3:1, 2:1, 3:2, 4:3, or the like.

When the upright portion 41 is made shorter, a distance between the board parallel portion 42 and the upper surface of the circuit board 3 is smaller. From the viewpoint of mountability on a vehicle, it is preferable to design the height to be small. On the other hand, when the upright portion 41 is made shorter, as to be described later, a distance between the metal portion of the vehicle body serving as the attachment target portion 200 and the board parallel portion 42 is smaller, the metal portion serving as the attachment target portion 200 acts as a reflector, and a possibility of narrowing an angle of directivity increases. The length of the upright portion 41 is preferably set to be a value as large as possible in a range in which the gain of the board horizontally polarized wave is at a predetermined request level.

As illustrated in FIG. 2, the antenna 4 is disposed on an X-axis positive direction side of the control circuit 32 in a posture in which the board parallel portion 42 is parallel to the Y-axis in a top view. For example, the antenna 4 is disposed in a posture in which the board parallel portion 42 is parallel to the Y-axis in a range within 2 cm from an edge portion of the circuit board 3 on an X-axis positive direction side. A positional relationship between the members on the circuit board 3, in other words, a layout can be appropriately changed. For example, the antenna 4 may be disposed in a posture in which the board parallel portion 42 is parallel to the X-axis in a range within 2 cm from an edge portion of the circuit board 3 on a Y-axis positive direction side. In the following description, the board parallel portion 42 can be understood as the horizontally polarized wave antenna 4*x*.

The circuit board 3 includes a ground layer serving as a conductor layer electrically connected to a ground-side line of a power supply cable via a connector or the like. The ground layer provides ground potentials for various circuits. As an example, the ground layer is formed on the lower surface of the circuit board 3. The conductor pattern formed on the ground layer is referred to as a ground pattern 35. The ground pattern 35 is a plate-shaped conductor member. A plate shape also includes a thin-film shape such as a copper foil. The ground pattern 35 corresponds to a ground portion.

Figure 4:
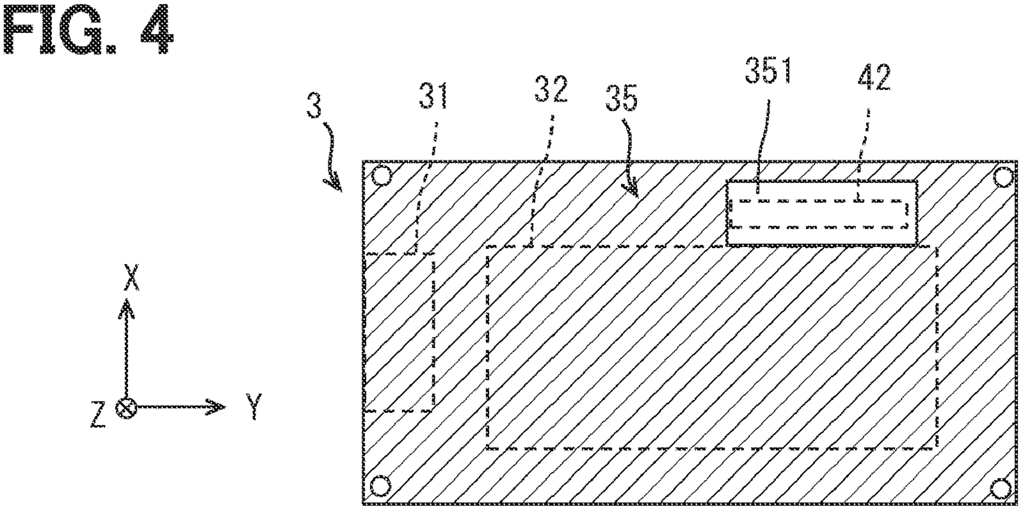
FIG. 4 is a view illustrating an example of a formation mode of a ground pattern.

As illustrated in FIG. 4, the ground pattern 35 is formed over most of the lower surface of the circuit board 3. However, the ground pattern 35 is formed in a manner of avoiding a portion facing the board parallel portion 42. More specifically, the ground pattern 35 is formed at a distance of 2 mm or more from a portion overlapping the board parallel portion 42. For example, the ground pattern 35 includes a slot portion 351 serving as a notch at a position overlapping the board parallel portion 42.

The slot portion 351 is preferably larger than the board parallel portion 42, but the present disclosure is not limited thereto. The ground pattern 35 may be formed in a manner of overlapping a part of the board parallel portion 42. For example, in order to stabilize an operation of the antenna 4, the ground pattern 35 may be formed in a portion overlapping the lower end portion of the upright portion 41 in a top view. The slot portion 351 may be formed such that half or more of the board parallel portion 42 does not overlap the ground pattern 35. FIG. 4 is a view schematically illustrating a positional relationship of configurations when the circuit board 3 is viewed from a lower side. In FIG. 4, hatched portions indicate portions to which the ground pattern 35 is applied.

Figure 5:
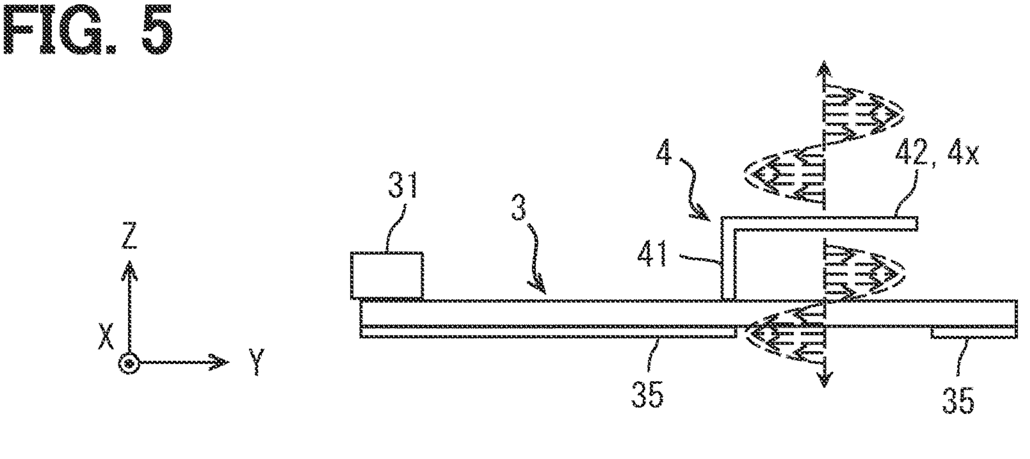
FIG. 5 is a schematic view illustrating a radiation direction and a polarization plane of a radio wave radiated from a board parallel portion.

According to the configuration in which the ground pattern 35 is formed in a manner of avoiding the portion overlapping the board parallel portion 42, the board horizontally polarized wave radiated from the board parallel portion 42 can also be transmitted and propagate to the lower side of the circuit board 3 as illustrated in FIG. 5. A distance from a nearest conductor plate, which is present below the board parallel portion 42, to the board parallel portion 42 can be increased. In addition, as the distance between the board parallel portion 42 and the conductor plate decreases, an angle of a reachable range tends to be narrowed substantially due to an influence of reflection by the conductor plate. In view of such circumstances, according to the above configuration, the distance between the board parallel portion 42 and the conductor plate can be increased, and a possibility of narrowing the angle of the reachable range can be reduced. As a premise, a conductor serving as the conductor layer is not formed at least in the portion overlapping the board parallel portion 42 inside the circuit board 3. Inside the circuit board 3, an internal conductor layer may be appropriately formed in a region not overlapping the board parallel portion 42.

The ground pattern 35 corresponds to a ground plate for the antenna 4. In one aspect, the circuit board 3 corresponds to a configuration in which the inverted-L antenna is disposed on one surface of a dielectric plate having predetermined thickness and relative dielectric constant, and the ground plate is provided on an opposite surface. Of course, the ground pattern 35 serving as the ground plate may be formed inside the circuit board 3. The configuration disclosed herein is an example, and for example, the circuit board 3 may include a power supply layer serving as another internal conductor layer.

The lower case 1 is a member that covers the circuit board 3 from below and accommodates and supports the circuit board 3. The lower case 1 corresponds to a member that provides a bottom portion of the housing in the vehicle wireless device 100. The lower case 1 corresponds to a configuration for protecting the lower surface of the circuit board 3. The lower case 1 is formed using a synthetic resin such as polycarbonate (PC). The lower case 1 is formed in, for example, a flat plate shape.

The lower case 1 is formed in a flat (in other words, the bottom is shallow) box shape with an opened upper surface. That is, the lower case 1 includes a bottom 11 facing the circuit board 3 at a predetermined interval, and a lower wall 12 extending upward from edge portions of the bottom 11. The lower wall 12 may be any element and may be omitted. Through holes 13 each for a screw to pass through are provided in the bottom 11 at positions corresponding to the screw holes 33 provided in the circuit board 3. For example, the through holes 13 for screwing are provided at four corners of the bottom 11.

As a material of the lower case 1, various resins such as polycarbonate as described above can be adopted. The material of the lower case 1 may use a resin material capable of maintaining a desired intensity in a range (hereinafter referred to as a usage temperature range) assuming a temperature of an environment in which the vehicle wireless device 100 is used. The usage temperature range is set to be, for example, −20° C. or higher and 120° C. or lower.

As to be described later in another configuration example, the lower case 1 may be made of metal. According to the lower case 1 made of metal, an effect of improving an intensity of the device or an effect of improving electrical connection, in other words, stability of a circuit ground with the vehicle body can be expected. Further, the lower case 1 may be implemented by combining a metal member and a resin. For example, the lower case 1 may adopt a configuration in which a metal frame is covered with a resin, in other words, a configuration in which the metal frame is embedded in a resin member that provides an outer shape. In the lower case 1, a portion facing the board parallel portion 42 to be described later is preferably made of resin to allow radio waves to transmit therethrough.

The upper case 2 is a member that covers the circuit board 3 from above and accommodates and protects the circuit board 3. The upper case 2 is made of a resin material such as polycarbonate to allow radio waves to transmit therethrough. The upper case 2 can fit into the lower case 1 while accommodating the circuit board 3.

The upper case 2 is formed substantially in a box shape with an opened lower surface. Specifically, the upper case 2 includes a ceiling portion 21 facing the upper surface of the circuit board 3 at a predetermined interval, and a side wall 22 extending downward from edge portions of the ceiling portion 21. The ceiling portion 21 corresponds to a configuration for providing an upper surface portion of the housing in the vehicle wireless device 100. The side wall 22 may have dimensions and a shape such that a lower end portion thereof is combined with an upper end portion of the lower wall 12. An outer side surface of the side wall 22 corresponds to a side surface.

In the side wall 22 of the upper case 2, a notch 23 for exposing the vicinity of tips of the connector 31 is formed in a portion corresponding to the connector 31. In the side wall 22 of the upper case 2, a marker 24 indicating a position of the board parallel portion 42 is provided in a portion located at a lateral side of the board parallel portion 42. The marker 24 may be a printed line or may have a three-dimensional structure such as a step or a groove. According to the configuration in which the marker 24 is provided on a side surface of the upper case 2, the board parallel portion 42 can be easily adjusted to a position away from a surface of the attachment target portion 200 by $\lambda/4$ at a time of attachment. The marker 24 may be any element and may be omitted. In addition, on an inner side of the upper case 2, a step portion or the like provided with a hole for accommodating a screw is provided at a position corresponding to each screw hole 33.

The case formed by combining the lower case 1 and the upper case 2 is configured to have an electrical thickness of $\lambda/4$ or more at least in the portion in which the antenna 4 is formed, due to the wavelength shortening effect provided by the circuit board 3 or a sealing member St. The side wall 22 or the bottom 11 may be provided with a metal fitting or the like for attaching the vehicle wireless device 100 to the vehicle body. Various mechanisms can be adopted as attachment mechanisms serving as mechanisms for fixing the vehicle wireless device 100 to the vehicle body.

Since the vehicle wireless device 100 is attached in a posture in which the circuit board 3 faces the attachment target portion 200, the board horizontally polarized wave corresponds to a linearly polarized wave in which the vibration direction of the electric field is also parallel to the surface of the attachment target portion 200. That is, the horizontally polarized wave antenna corresponds to an antenna capable of transmitting and receiving a linearly polarized wave in which the vibration direction of the electric field is parallel to a metal surface of the attachment target portion 200. The board vertically polarized wave corresponds to a linearly polarized wave in which the vibration direction of the electric field is also perpendicular to the attachment target portion 200.

Developers of the present disclosure have performed simulations under various conditions in which the distance between the vehicle body and the antenna and the attachment posture are changed, and have found that the reachable range is likely to be narrowed when the distance from the horizontally polarized wave antenna 4*x*, as compared with the vertically polarized wave antenna, to the attachment target portion 200 is smaller. More specifically, it has been found that when the distance between the horizontally polarized wave antenna 4*x* and the vehicle body is smaller, radio waves are less likely to wrap around a back side of the attachment target portion 200.

Figure 6:
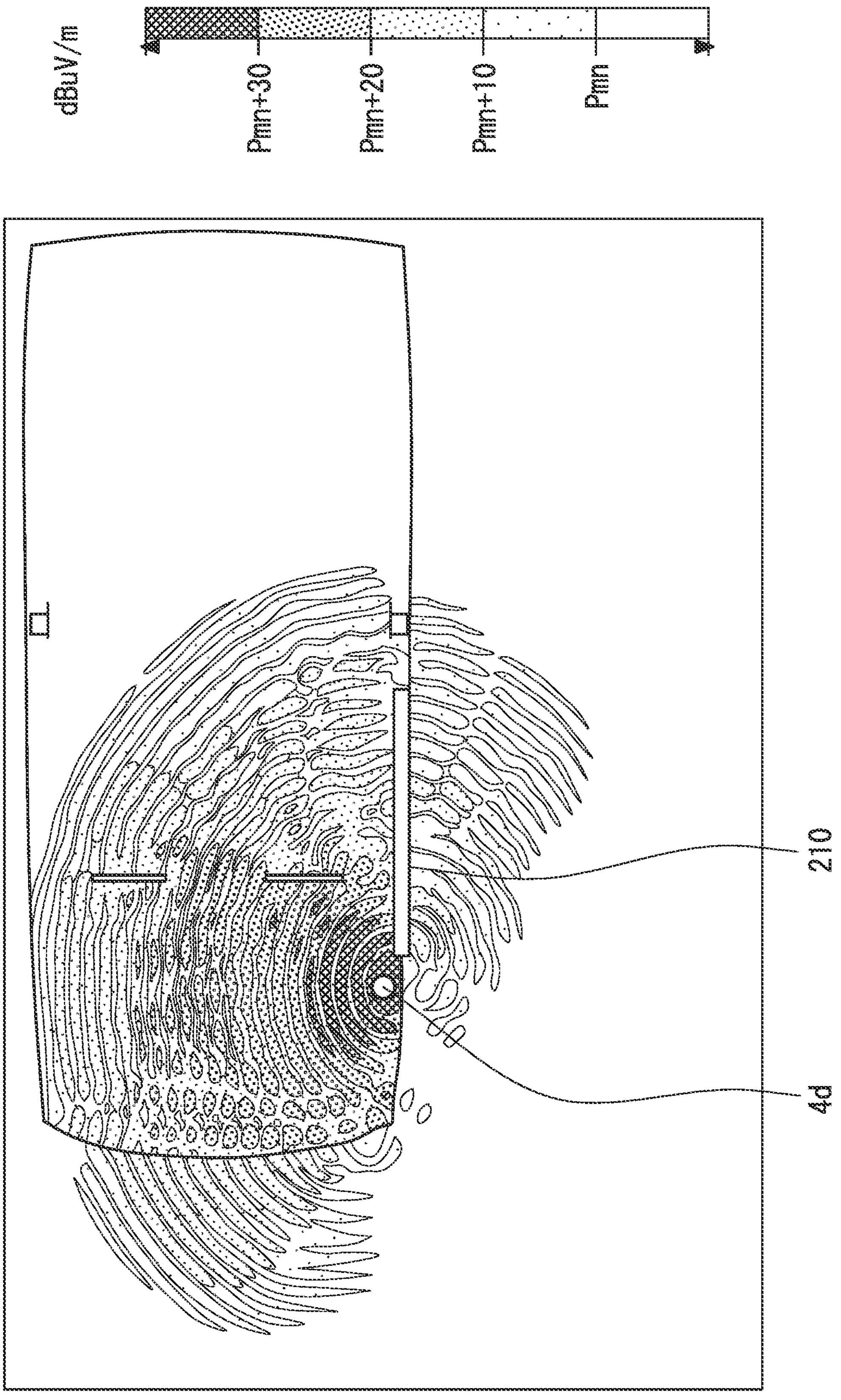
FIG. 6 is a diagram illustrating a simulation result of propagation intensity when a dipole antenna is disposed at a position 9 mm away from a C pillar in a posture along a vehicle height direction.
Figure 7:
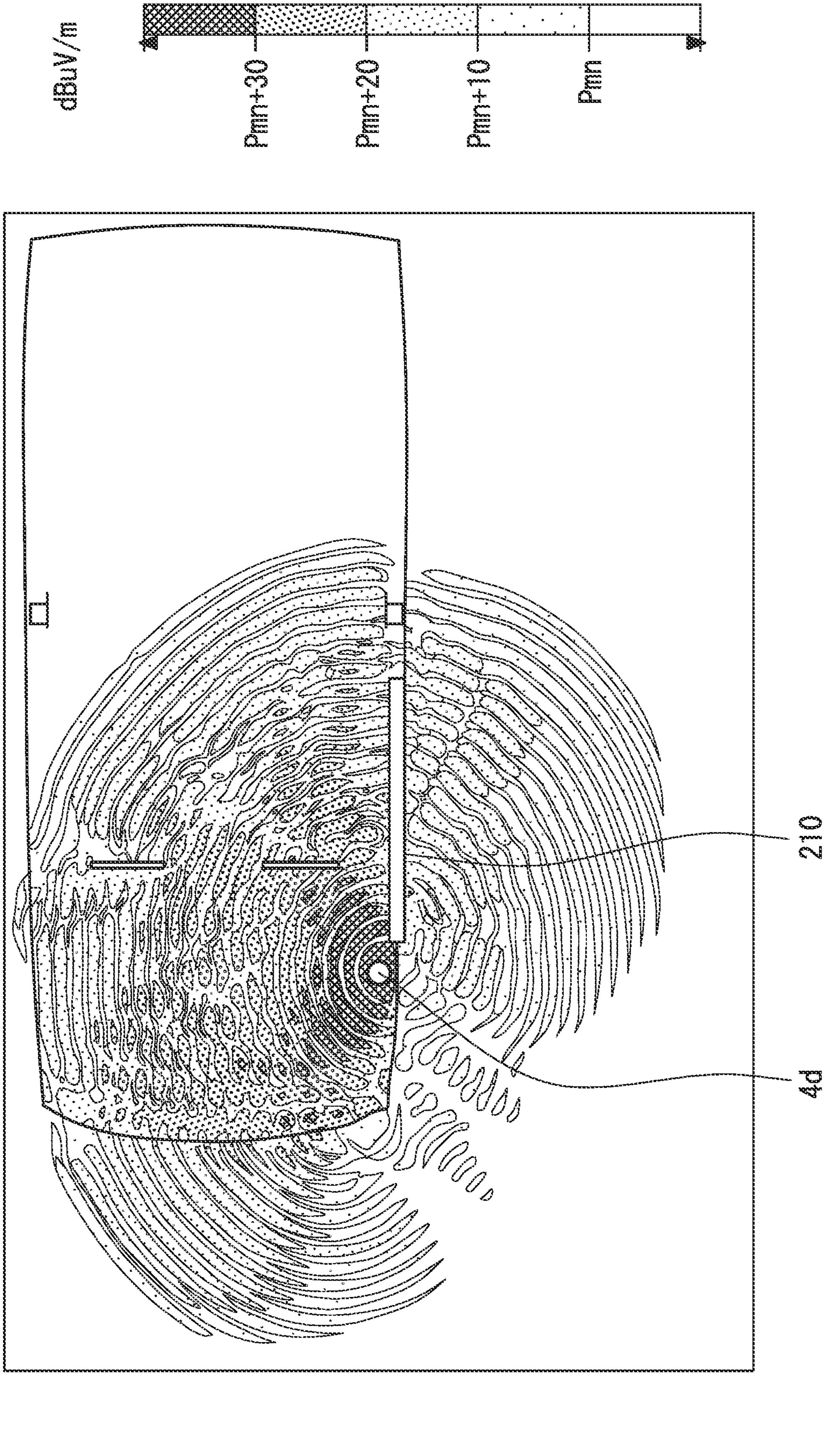
FIG. 7 is a diagram illustrating a simulation result of propagation intensity when the dipole antenna is disposed at a position 60 mm away from the C pillar in a posture along the vehicle height direction.

FIGS. 6 and 7 illustrate simulation results of propagation intensity of a direct wave when a dipole antenna 4*d*, which serves as the horizontally polarized wave antenna 4*x*, is attached to an interior-side surface of a metal C pillar located on a right side of the vehicle in a posture along a vehicle height direction. FIG. 6 illustrates intensity distribution when the distance between the dipole antenna 4*d* serving as the horizontally polarized wave antenna and the surface of the C pillar is set to be 9 mm (corresponding to 0.075$\lambda$). FIG. 7 illustrates intensity distribution when the distance between the dipole antenna 4*d* and the surface of the C pillar is set to be 60 mm (corresponding to 0.5$\lambda$).

As a simulation condition, an attachment position of the dipole antenna 4*d* is set at a position having a height of 110 cm from a ground. FIGS. 6 and 7 illustrate maximum values of an electric field intensity in a period from a start of radio wave radiation until 5 nanoseconds elapse in a plane having a height of 110 cm from the ground. When an observation period of the propagation intensity is 5 nanoseconds or more, a propagation range of the direct wave or the like is difficult to understand due to involvement of an influence of a reflected wave on the metal portion of the vehicle body away from the attachment target portion 200 by 1.5 m or more, for example, the C pillar on the left or the like. Therefore, the observation period of the propagation intensity is divided within 5 nanoseconds from the start of radio wave radiation.

Pmn illustrated in FIGS. 6 and 7 represents an operation lower limit value, which is a lower limit value of a reception strength with which the mobile terminal can normally decode a signal from the antenna 4. The operation lower limit value Pmn corresponds to a lower limit value of a signal level at which communication between the mobile terminal and the vehicle wireless device 100 is established. The operation lower limit value Pmn varies depending on power, with which the vehicle wireless device 100 transmits a radio signal, or reception sensitivity. The operation lower limit value Pmn may be 130 dBuV/m, 110 dBuV/m, or 80 dBuV/m depending on setting of the transmission power, reception sensitivity, or the like. Density of dot patterns in FIGS. 6 and 7 indicates a level of the propagation intensity, which means that when the density of the dot patterns is higher, the propagation intensity is greater. Of course, a region in which the propagation intensity is greater than the operation lower limit value Pmn is an area having stable communication.

As can be seen from a comparison between FIGS. 6 and 7, the electric field intensity in the vicinity of a door outside the vehicle compartment in FIG. 7 is greater than that in FIG. 6. It is estimated to be because, when the horizontally polarized wave antenna is closer to the C pillar serving as the attachment target portion 200, the radiated board horizontally polarized wave is more likely to be repelled toward the vehicle compartment by the metal surface. As a result, the board horizontally polarized wave is less likely to wrap around the vehicle exterior via the window portion 210. As illustrated in FIGS. 7 and 6, when the dipole antenna **4*d* is closer to the C pillar, an angle range of propagation is narrower in which the intensity is maintained to be equal to or greater than a predetermined value. It is estimated to be because the C pillar present behind the dipole antenna 4*d*** acts as a reflector.

An example is described above in which the attachment target portion 200 is assumed as the reflector of radio waves radiated from the horizontally polarized wave antenna **4*x*. Alternatively, the conductor plate such as the ground pattern 35 can also act as the reflector. In order to maintain good communication performance of the horizontally polarized wave antenna, it is preferable to dispose the horizontally polarized wave antenna 4*x*** as far as possible from the conductor plate that can be a reflector.

The vehicle wireless device 100 according to the present embodiment has been made in view of the above circumstances. That is, when the ground pattern 35 is formed in a manner of avoiding the portion facing the board parallel portion 42 and the lower case 1 is made of resin, a rear conductor plate BM for the board parallel portion 42 is the attachment target portion 200. The rear conductor plate BM refers to a conductor plate located immediately below the board parallel portion 42 and closest to the board parallel portion 42. The conductor plate also includes a thin-film conductor having a certain area, which is patterned by plating or the like, such as the ground pattern 35.

According to the above configuration, a distance from the board parallel portion 42 to the rear conductor plate BM can be increased as compared with a case in which the ground pattern 35 is formed immediately below the board parallel portion 42 or the case in which the lower case 1 is made of metal.

Figure 8:
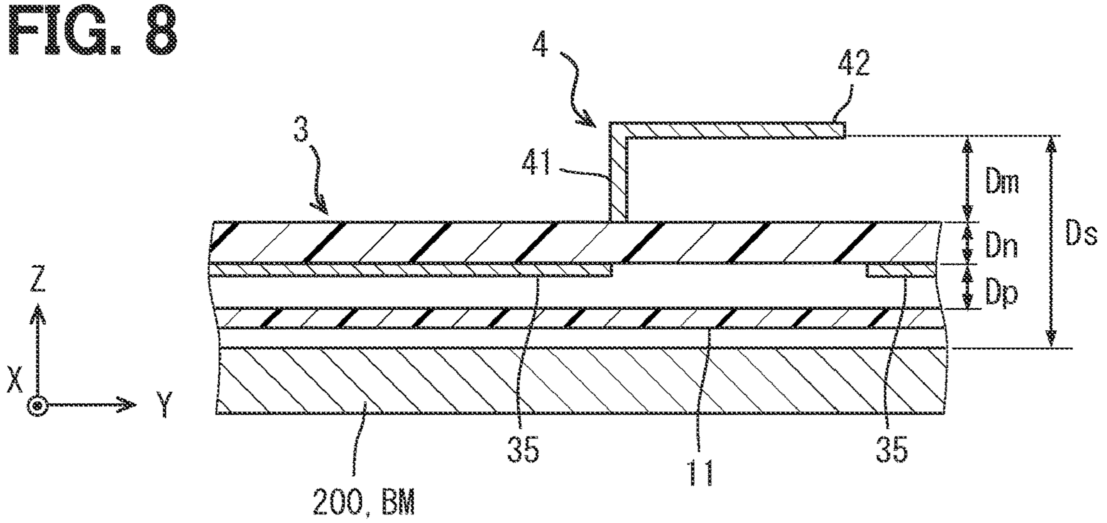
FIG. 8 is a view illustrating an effect of an embodiment.

Specifically, when the ground pattern 35 is formed immediately below the board parallel portion 42, the ground pattern 35 corresponds to the rear conductor plate BM. Therefore, the distance from the board parallel portion 42 to the rear conductor plate BM is Dm+Dn illustrated in FIG. 8. Dm is a distance from the board parallel portion 42 to the upper surface of the circuit board 3. Dn indicates an electrical distance corresponding to a thickness of the circuit board 3. Dn can be measured as an effective length in consideration of the wavelength shortening effect of the dielectric.

When the lower case 1 is made of metal while the ground pattern 35 is not formed immediately below the board parallel portion 42, the lower case 1 corresponds to the rear conductor plate BM. Therefore, the distance from the board parallel portion 42 to the rear conductor plate BM is Dm+Dn+Dp. Dp indicates a distance from the lower surface of the circuit board 3 to the bottom 11.

With this assumed configuration, according to the above embodiment, the distance from the board parallel portion 42 to the rear conductor plate BM is a distance Ds from the board parallel portion 42 to the attachment target portion 200. That is, a thickness of the bottom 11 is increased by a gap between the surface of the attachment target portion 200 and the bottom 11. Therefore, as compared with the assumed configuration described above, an influence of the rear conductor plate BM on formation of a communication area can be restricted. As a result, the communication area can be favorably provided. The influence of the rear conductor plate BM due to reflection of radio waves indicates that, for example, a substantial communication area has an acute angle, and that the radio waves is difficult to travel to the back side of the attachment target portion 200.

The developers of the present disclosure have found that, by setting the distance from the board parallel portion 42 to the rear conductor plate BM to be $\lambda/4$ or more, a gain in a direction along the attachment target portion 200 or the amount of wrapping around the back side of the attachment target portion 200 can be increased. Therefore, it is preferable that the board parallel portion 42 be used by being attached in a manner of being away from the metal portion of the vehicle body by $\lambda/4$ or more. In other words, it is preferable to attach the vehicle wireless device 100 in a mode of satisfying a relationship of $Ds>\lambda/4$. The back side of the attachment target portion 200 refers to the vehicle exterior when, for example, the vehicle wireless device 100 is attached to the interior-side surface of the metal portion of the vehicle body. When the vehicle wireless device 100 is attached to the exterior-side surface of the metal portion of the vehicle body, the back side of the attachment target portion 200 refers to the vehicle interior.

When the marker 24 is not present on an outer surface of the upper case 2, a specific position of the board parallel portion 42 in the case is unclear. Therefore, it may be difficult for a worker, who attaches the vehicle wireless device 100, to attach the vehicle wireless device 100 to the vehicle in the mode of satisfying the relationship of $Ds>\lambda/4$. In response to this, according to the configuration in which the marker 24 is provided on the outer surface of the upper case 2, the vehicle wireless device 100 is easily attached to the attachment target portion 200 in a manner of satisfying the relationship of Ds>λ/4. That is, a proper distance is easily maintained, and workability of attachment can be improved.

The embodiment according to the present disclosure has been described above, but the present disclosure is not limited to the above-described embodiment, and various modifications to be described below or a second embodiment is also included in the technical scope of the present disclosure. Further, the present disclosure can be variously modified without departing from the spirit of the disclosure in addition to the following modifications. For example, the following various supplements or modifications can be appropriately combined within a range in which no technical contradiction arises. Members having the same functions as those described above are denoted by the same reference numerals, and description thereof will be omitted. When only a part of a configuration is described, the above description can be applied to other parts.

Figure 9:
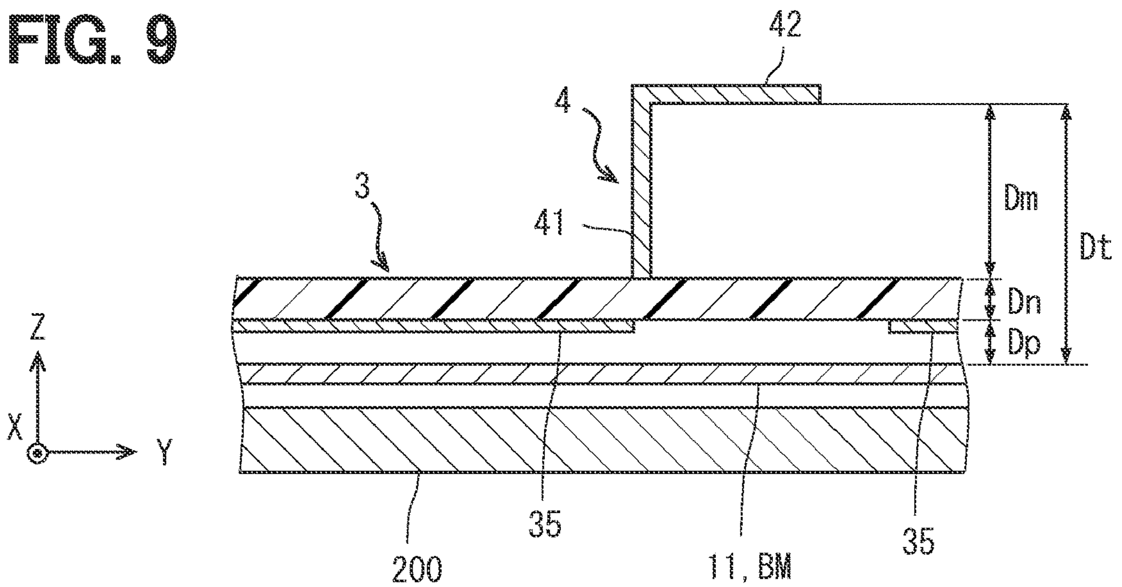
FIG. 9 is a view illustrating a modification of a vehicle wireless device.

In the above-described embodiment, a configuration in which the lower case 1 is made of resin has been described. Alternatively, the lower case 1 may be made of metal. As illustrated in FIG. 9, when the lower case 1 is made of metal and the ground pattern 35 is formed in a manner of avoiding the board parallel portion 42, it is preferable that the distance Dt from the board parallel portion 42 to the lower case 1 be set to be an electrical length λ/4 or more. The above configuration corresponds to a configuration in which a conductor plate such as the ground pattern 35 is not provided in a region extending by λ/4 downward from the board parallel portion 42.

Since λ/4 in vacuum or air corresponds to 30 mm, a height of a device is increased when a portion subjected to a wavelength shortening effect is only inside of a circuit board 3. Since a space available for mounting the vehicle wireless device 100 in a vehicle is limited, it is preferable that the vehicle wireless device 100 be implemented as thin as possible.

Figure 10:
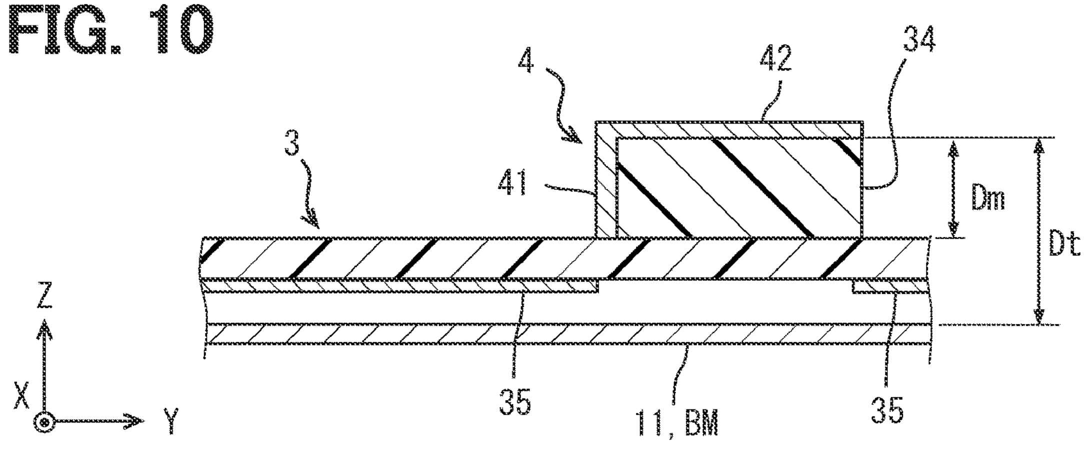
FIG. 10 is a view illustrating a modification of a vehicle wireless device.

Under such circumstances, as illustrated in FIG. 10, the support portion 34 using a dielectric having a relative dielectric constant equal to or greater than a predetermined value may be inserted between the board parallel portion 42 and the circuit board 3. According to this configuration, an effective length from the board parallel portion 42 to the bottom 11 serving as the rear conductor plate BM can be made larger than that in a configuration having a hollow space between the board parallel portion 42 and the circuit board 3 as illustrated in FIG. 9. As a result, it is possible to restrict the height of the device required when the distance Dt is an electrical length of λ/4 or more. The configuration illustrated in FIG. 10 corresponds to a configuration in which the antenna 4 is formed on a surface of the support portion 34 as illustrated in FIG. 3 from the viewpoint of one aspect. In addition, a part of the space between the board parallel portion 42 and the circuit board 3 may be hollow.

Figure 11:
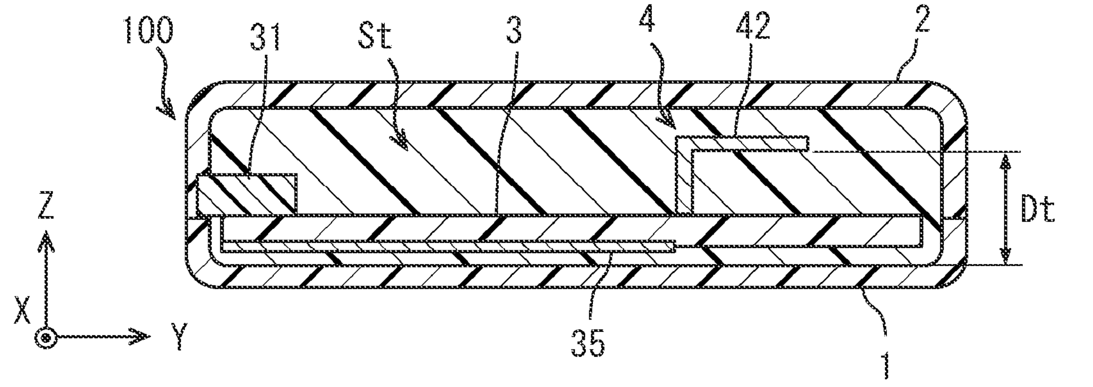
FIG. 11 is a view illustrating a modification of a vehicle wireless device.

When a dielectric material is applied between the board parallel portion 42 and the circuit board 3, the electrical distance Dt is increased. Based on such a viewpoint, inside of the case may be filled with the sealing member St in a gel form as illustrated in FIG. 11. The sealing member St corresponds to a sealing material. Various materials can be adopted as the sealing member St, for example, urethane resin such as polyurethane prepolymer, epoxy resin, and silicone resin. According to the configuration in which the case is filled with the sealing member St, in addition to an effect of restricting the height of the device and preventing narrowing of a communication area, it is also possible to improve a waterproof property or a dustproof property, and vibration resistance. In FIG. 11, the control circuit 32 is not illustrated.

Figure 12:
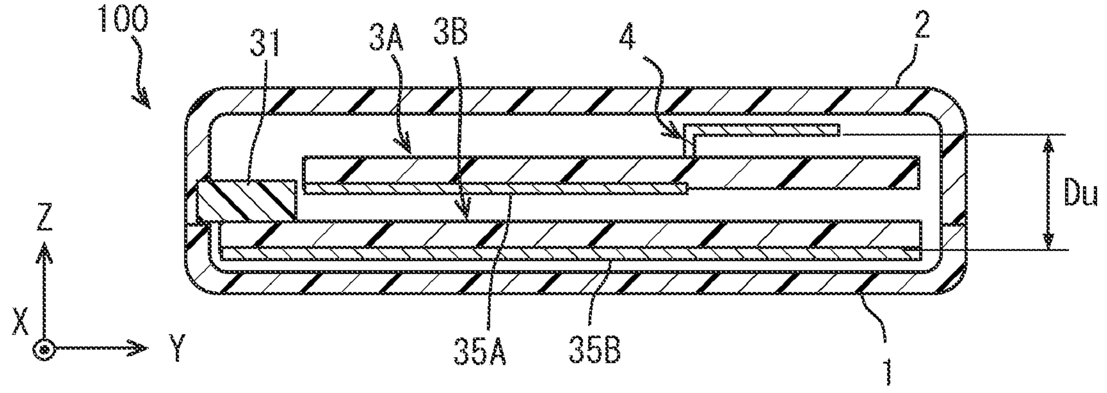
FIG. 12 is a view illustrating a modification of a vehicle wireless device.

A case in which one circuit board 3 is accommodated in the case has been described above, but the present disclosure is not limited thereto. As illustrated in FIG. 12, the vehicle wireless device 100 may include a first board 3A on which the antenna 4 and a part of the control circuit 32 are provided, and a second board 3B on which a remaining part of the control circuit 32 is provided. The second board 3B is disposed below the first board 3A in a posture of facing the first board 3A.

A ground pattern 35A is formed on a lower surface of the first board 3A in a manner of avoiding a region overlapping the board parallel portion 42 in a top view. On the other hand, a ground pattern 35B is formed on a lower surface of the second board 3B in a region overlapping the board parallel portion 42 as well in a top view. The second board 3B is preferably disposed at a position at which a distance from the board parallel portion 42 to the ground pattern 35B is an electrical distance λ/4 or more. The ground pattern 35B included in the second board 3B corresponds to a second board ground portion.

When the thickness of the circuit board 3 is the electrical distance λ/4 or more, the ground pattern 35 may also be formed in a portion facing the board parallel portion 42 on a lower surface of the circuit board 3.

Further, an aspect has been disclosed above as an example in which the antenna 4 that functions as the horizontally polarized wave antenna 4*x* is an inverted-L antenna standing from the circuit board 3, but a type or shape of the antenna 4 is not limited thereto.

Figure 13:
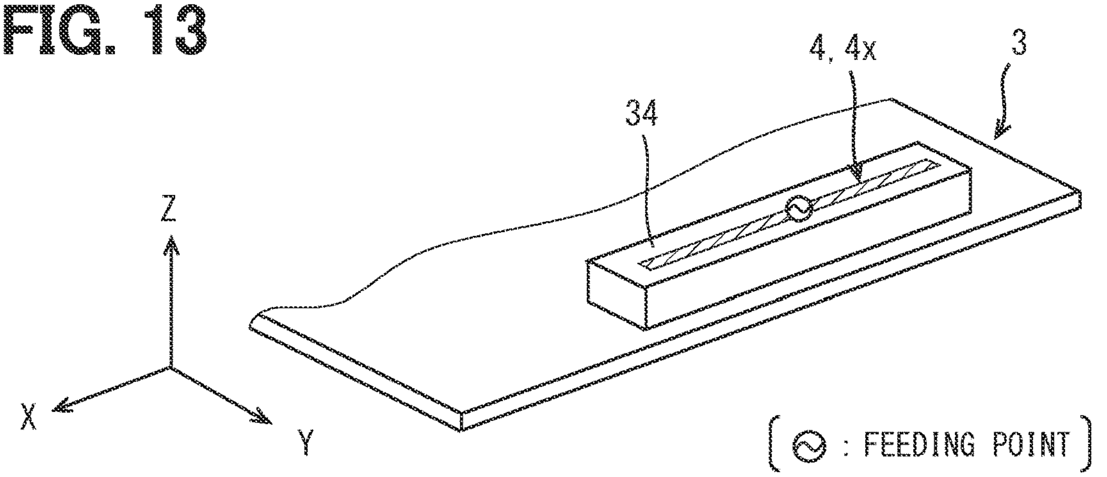
FIG. 13 is a view illustrating a modification of an antenna capable of receiving a board horizontally polarized wave.

For example, as illustrated in FIG. 13, the antenna 4 and the horizontally polarized wave antenna 4*x* may be dipole antennas. The dipole antenna serving as the horizontally polarized wave antenna 4*x* is disposed, for example, on an upper surface of the support portion 34. In a mode illustrated in FIG. 13, the entire dipole antenna corresponds to the board parallel portion. In this case, the support portion 34 is formed in a rectangular parallelepiped shape having a length of λ/2 or more in a longitudinal direction. The support portion 34 may have any shape as long as the dipole antenna can be mounted thereon. In cases in which a structure for limiting dimensions of the dipole antenna is adopted, such as a case in which a part of the dipole antenna is temporarily bent or a case in which the dipole antenna is formed in a meander shape, the support portion 34 may have a length of λ/2 or less. The dipole antenna serving as the antenna 4 does not need to be formed on the support portion 34 protruding from a surface of the circuit board 3. The dipole antenna serving as the antenna 4 may be formed on an upper surface of the circuit board 3.

Figure 14:
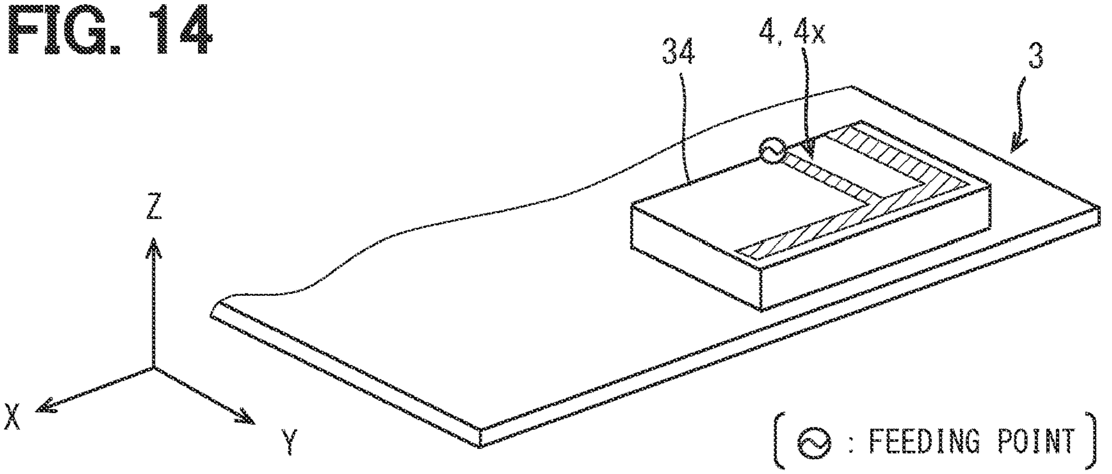
FIG. 14 is a view illustrating a modification of an antenna capable of receiving a board horizontally polarized wave.

Further, the antenna 4 may be an inverted-F antenna as illustrated in FIG. 14. The inverted-F antenna serving as the antenna 4 is disposed, for example, on the upper surface of the support portion 34. According to a posture illustrated in FIG. 14, the entire inverted-F antenna corresponds to the board parallel portion. The support portion 34 may have any shape as long as the inverted-F antenna serving as the antenna 4 can be mounted thereon. The inverted-F antenna serving as the antenna 4 does not need to be formed on the support portion 34. The inverted-F antenna serving as the antenna 4 may be formed on the upper surface of the circuit board 3. Although FIGS. 13 and 14 are not cross-sectional views, the antenna 4 is hatched with an oblique-line pattern in order to clarify a formation location of the antenna 4.

Figure 15:
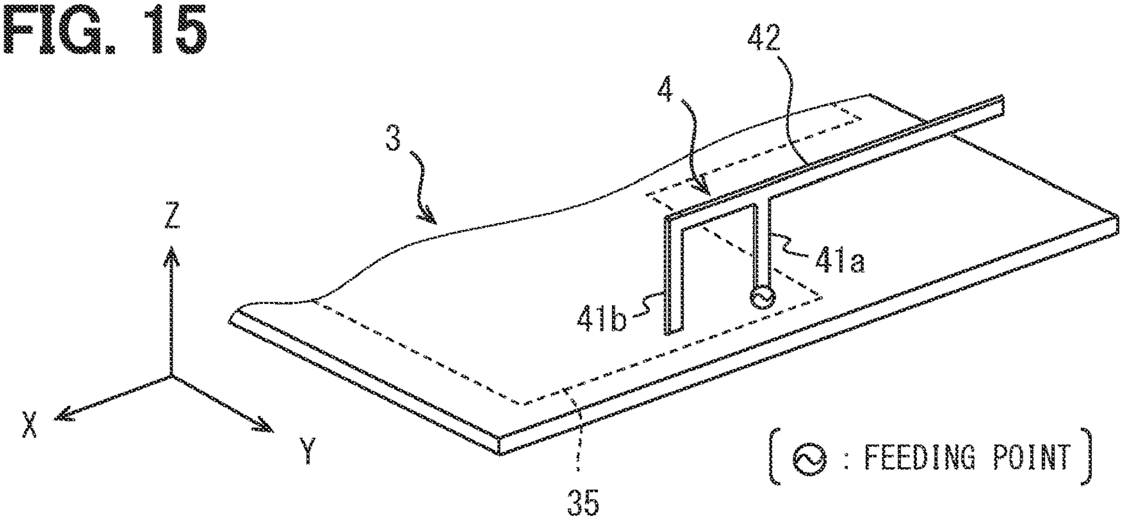
FIG. 15 is a view illustrating a modification of an antenna capable of receiving a board horizontally polarized wave.

The antenna 4 may be a three-dimensional inverted-F antenna as illustrated in FIG. 15. The three-dimensional inverted-F antenna serving as the antenna 4 is attached in a manner of standing from the circuit board 3, for example, from an end portion of the circuit board 3 on a Y-axis positive direction side. That is, the three-dimensional inverted-F antenna serving as the antenna 4 is formed in an inverted-F shape including a first upright portion 41*a* having a feeding point provided at a lower end, a second upright portion 41*b* having a lower end connected to the ground pattern 35, and the board parallel portion 42. The first upright portion 41*a* and the second upright portion 41*b* are both linear conductors standing on the circuit board 3. The first upright portion 41*a* and the second upright portion 41*b* may self-stand on the circuit board 3, or may be supported by the support portion 34. The first upright portion 41*a* and the second upright portion 41*b* may be formed on the surface of or inside the support portion 34.

A length of the board parallel portion 42 is set to be an electrical distance λ/4. The first upright portion 41*a* and the second upright portion 41*b* have the same length, and the length thereof can be any value. In a shape illustrated in FIG. 15, the board parallel portion 42 transmits and receives a board horizontally polarized wave, and the first upright portion 41*a* operates to transmit and receive a board vertically polarized wave. That is, according to the three-dimensional inverted-F antenna illustrated in FIG. 15, both the board horizontally polarized wave and the board vertically polarized wave can be transmitted and received by one element.

In the three-dimensional inverted-L antenna illustrated in FIG. 1 and the like, the board parallel portion 42 is supported by one upright portion 41, while in the three-dimensional inverted-F antenna, the board parallel portion 42 is supported by two upright portions including the first upright portion 41*a* and the second upright portion 41*b*. Therefore, according to the configuration in which the three-dimensional inverted-F antenna is adopted as the antenna 4, a fixing intensity of the antenna 4 to the circuit board 3 can be increased as compared with the configuration in which the three-dimensional inverted-L antenna is adopted. In particular, when the antenna 4 is mounted on the vehicle, vibration of a vehicle body acts on the antenna 4. When the fixing intensity between the circuit board 3 and the antenna 4 is insufficient, the antenna 4 may be detached from the circuit board 3 due to the vibration of the vehicle body. In view of such circumstances, the antenna 4 is preferably a three-dimensional inverted-F antenna rather than a three-dimensional inverted-L antenna.

In the three-dimensional inverted-F antenna, it is preferable that half or more of the board parallel portion 42 be disposed in a manner of not overlapping the ground pattern 35. In other words, the antenna 4 is preferably disposed such that most of the board parallel portion 42 is located on a non-ground forming portion 36. A reason for this is that, when the ground pattern 35 is present below the board parallel portion 42, an electromagnetic wave derived from a current flowing through the board parallel portion 42 and an electromagnetic wave derived from a current flowing through the ground pattern 35 act to cancel each other out, and a gain of the board horizontally polarized wave is decreased.

Dashed lines in FIG. 15 indicate a formation range of the ground pattern 35. FIG. 15 illustrates a configuration in which a part of a section of the board parallel portion 42 on an open-end side with respect to the first upright portion 41*a* is disposed in a manner of overlapping the ground pattern 35. Of course, the board parallel portion 42 is preferably located above the non-ground forming portion 36 as much as possible.

When viewed from an opposite side, a radiation element in the inverted-F shape appears to be in an F shape. The expression "inverted-F antenna" follows a customary name in the technical field of antennas. The expression "inverted-F antenna" also includes an F-shaped antenna that is not inverted. That is, the inverted-F antenna can also be called an F-shaped antenna. Similarly, the expression "inverted-L antenna" also includes an L-shaped antenna that is not inverted.

In addition, the antenna 4 only needs to be capable of receiving the board horizontally polarized wave, and various structures such as a patch antenna can be adopted. The antenna 4 may be provided on the circuit board 3 in a posture capable of receiving the board horizontally polarized wave. As a feeding method to the antenna 4, an electromagnetic coupling feeding method or the like can be adopted in addition to a direct feeding method in which power is directly fed using a conductive pin or a conductor pattern.

FIGS. 13 and 14 disclose the configurations provided in the vicinity of the end portion of the circuit board 3 on the Y-axis positive direction side, a position of the antenna 4 can be appropriately changed as described above. The antenna 4 may be patterned on an inner side surface of the ceiling portion 21. The antenna 4 formed on an inner side of the ceiling portion 21 may be fed with power using, for example, a feed line formed along an inner side surface of the side wall 22. According to this configuration, since the antenna 4 can be disposed at the highest position in the case, an influence of the rear conductor plate BM can be further reduced.

Figure 16:
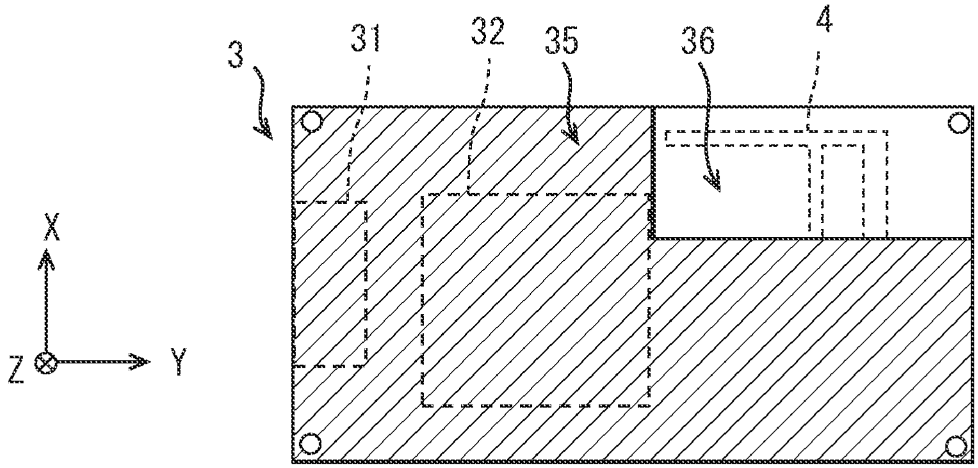
FIG. 16 is a view illustrating a modification of a formation mode of a ground pattern.

In the above-described embodiment, as illustrated in FIG. 4, the configuration is disclosed in which a slot portion 351 serving as a local notch is provided in the ground pattern 35. However, the configuration for allowing radio waves to transmit from the board parallel portion 42 to the lower side of the circuit board 3, in other words, the configuration for increasing a distance from the board parallel portion 42 to the rear conductor plate BM is not limited thereto. For example, as illustrated in FIG. 16, the non-ground forming portion 36, which is a region not provided with the ground pattern 35, may be set to be sufficiently larger than the horizontally polarized wave antenna 4. FIG. 16 illustrates a case in which an inverted-F antenna is adopted as the antenna 4. In order to clarify a range in which the ground pattern 35 is formed, the range is hatched with oblique lines for convenience.

The ground pattern 35 is preferably formed at least in a region corresponding to a lower side of the control circuit 32. The above-described slot portion 351 also corresponds to the non-ground forming portion 36. The above embodiment corresponds to a configuration in which the board parallel portion 42 or the horizontally polarized wave antenna 4*x* is provided above the non-ground forming portion 36. A position or a shape of the non-ground forming portion 36 can be appropriately changed. The non-ground forming portion 36 may have a rectangular shape, a circular shape, or a triangular shape.

Figure 17:
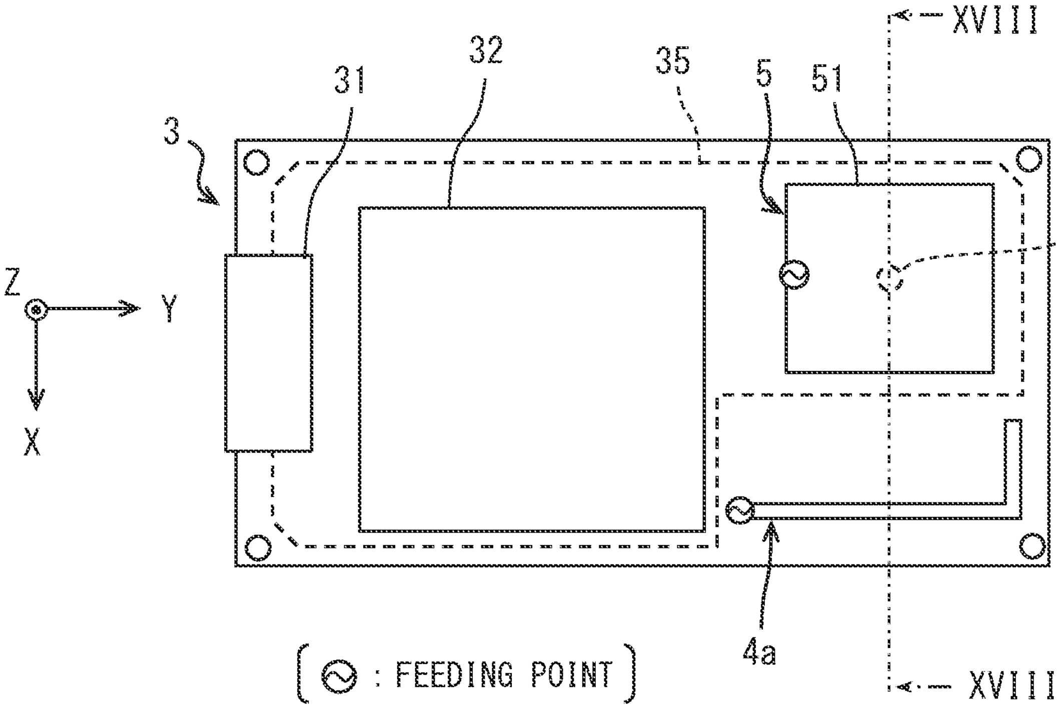
FIG. 17 is a view illustrating a configuration example of a circuit board when a vehicle wireless device includes a vertically polarized wave antenna.

As illustrated in FIG. 17, the circuit board 3 may be provided with a vertically polarized wave antenna 5 in addition to the horizontally polarized wave antenna 4*x*. The vertically polarized wave antenna 5 is, for example, a zero-order resonance antenna. That is, the vertically polarized wave antenna 5 includes a facing conductor plate 51 that is a flat plate-shaped metal conductor disposed in a manner of facing the ground pattern 35, and a short-circuit portion 52 that electrically connects a center of the facing conductor plate 51 to the ground pattern 35. A size of the facing conductor plate 51 is configured in a manner of performing parallel resonance at a target frequency due to an inductance of the short-circuit portion 52 and a capacitance provided by the ground pattern 35 and the facing conductor plate 51.

The zero-order resonance antenna has a mushroom structure, which is a basic structure of a metamaterial, and corresponds to an antenna that uses a phenomenon of resonance at a frequency at which a phase constant 13 is zero (0) among dispersion characteristics of the metamaterial. The zero-order resonance antenna can also be called a metamaterial antenna. The vertically polarized wave antenna 5 serving as the zero-order resonance antenna operates by LC parallel resonance between the capacitance provided between the ground pattern 35 and the facing conductor plate 51 and the inductance of the short-circuit portion 52.

Figure 18:
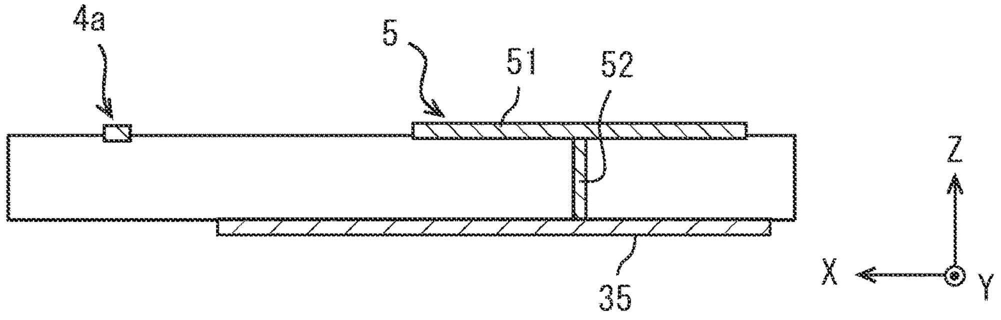
FIG. 18 is a schematic view illustrating a cross section taken along a line XVIII-XVIII illustrated in FIG. 17.

FIG. 17 illustrates a configuration in which an L-shaped antenna patterned on the upper surface of the circuit board 3 is adopted as the horizontally polarized wave antenna 4*x*. FIG. 18 is a cross-sectional view taken along a line XVIII-XVIII illustrated in FIG. 17. In order to clarify components, a scale in FIG. 18 is changed from that in FIG. 19.

In FIG. 17, dashed lines indicated by 35 indicate a region in which the ground pattern 35 is formed. The ground pattern 35 is not formed in a region overlapping the horizontally polarized wave antenna 4*x*, but is formed in a region overlapping the facing conductor plate 51. In other words, the horizontally polarized wave antenna 4*x* is disposed in a region in which the ground pattern 35 is not formed, while the facing conductor plate 51 is disposed in a region in which the ground pattern 35 is formed.

The facing conductor plate 51 is a plate-shaped conductor member made of a conductor such as copper. The plate shape also includes a thin-film shape such as a copper foil as described above. The facing conductor plate 51 is disposed in a manner of facing the ground pattern 35 via a dielectric layer of the circuit board 3. The facing conductor plate 51 may also be patterned on the upper surface of the circuit board 3.

The facing conductor plate 51 is disposed in a manner of facing the ground pattern 35, thereby forming a capacitance corresponding to an area of the facing conductor plate 51 and an interval between the facing conductor plate 51 and the ground pattern 35. The facing conductor plate 51 is formed in a size that forms the inductance of the short-circuit portion 52 and a capacitance for performing parallel resonance at a main target frequency. The area of the facing conductor plate 51 may be appropriately designed to provide a desired capacitance. The desired capacitance is a capacitance that operates at the main target frequency in cooperation with the inductance of the short-circuit portion 52. When the operation frequency is f, the inductance of the short-circuit portion 52 is Ls, and the capacitance formed between the facing conductor plate 51 and the ground pattern 35 is C, a relationship of $f \approx$, $1/\{2\pi\sqrt{(Ls \times C)}\}$ is established. Those skilled in the art can determine an appropriate area of the facing conductor plate 51 based on the relational expression.

For example, the facing conductor plate 51 is formed in a square shape with one side of 25 mm. Of course, a length of one side of the facing conductor plate 51 can be appropriately changed, and may be 20 mm, 30 mm, 40 mm, or the like. Dimensions of the facing conductor plate 51 can be determined in view of the target wavelength, the wavelength shortening effect of the dielectric in the circuit board 3, and the like. A planar shape of the facing conductor plate 51 may be a circular shape, a regular octagonal shape, a regular hexagonal shape, or the like. The facing conductor plate 51 may have a rectangular shape, an elongated elliptical shape, or the like.

The short-circuit portion 52 is a conductive member that electrically connects the ground pattern 35 and the facing conductor plate 51. The short-circuit portion 52 may be implemented using a conductive pin (hereinafter, referred to as a short pin). By adjusting a diameter or a length of the short pin serving as the short-circuit portion 52, the inductance of the short-circuit portion 52 can be adjusted. A radius (r) of the short-circuit portion 52 is set to be, for example, 3 mm. Of course, the radius may be 1 mm, 2 mm, or 5 mm.

The short-circuit portion 52 has an inductance corresponding to the diameter or the length. An inductance value of the short-circuit portion 52 can be changed by, for example, adjusting the diameter (in other words, a thickness) and a Z-direction length of the short-circuit portion 52.

The short-circuit portion 52 may be a linear member having one end electrically connected to the ground pattern 35 and the other end electrically connected to the facing conductor plate 51. A via or the like of the circuit board 3 can be used as the short-circuit portion 52.

The short-circuit portion 52 is provided, for example, in a manner of being located at a center of the facing conductor plate 51. The center of the facing conductor plate 51 corresponds to an intersection point of diagonal lines when the facing conductor plate 51 has, for example, a square shape or a rectangular shape. In the present disclosure, the center of the facing conductor plate 51 is hereinafter also referred to as a conductor plate center.

A formation position of the short-circuit portion 52 does not need to strictly coincide with the conductor plate center. The short-circuit portion 52 may be shifted from the conductor plate center by about several millimeters. The short-circuit portion 52 may be formed in a central region of the facing conductor plate 51. The central region of the facing conductor plate 51 refers to a region inward of a line connecting points that internally divide the conductor plate center to an edge portion at 1:5. According to another aspect, the central region corresponds to a region in which concentric figures obtained by similarly reducing the facing conductor plate 51 to about ⅙ overlap each other.

A feeding point is disposed at a position at which impedance matching can be achieved in the facing conductor plate 51. The impedance matching refers to that an impedance value on a signal-sending side is substantially the same as an impedance value on a signal-receiving side.

As described above, according to the configuration including the vertically polarized wave antenna 5 in addition to the horizontally polarized wave antenna 4*x*, the vehicle wireless device 100 can transmit and receive two types of radio waves having orthogonal polarization planes. Polarization diversity is attainable and robustness is improved.

For a mobile terminal such as a smartphone assumed as one of communication partners of the vehicle wireless device 100, a posture with respect to the vehicle wireless device 100 changes depending on a mode in which the mobile terminal is carried by a user. Therefore, the polarization planes of the radio waves from the mobile terminal that arrives at the vehicle wireless device 100 can be varied. Under such circumstances, according to the configuration including the vertically polarized wave antenna 5 in addition to the horizontally polarized wave antenna 4*x*, it is possible to receive a radio signal more favorably from the mobile terminal carried by the user. As a result, approach of the user (mobile terminal) to the vehicle and a position of the user with respect to the vehicle can be detected with higher accuracy.

The board vertically polarized wave propagates along the rear conductor plate BM regardless of the distance from the rear conductor plate BM. Therefore, from the viewpoint of improving the amount of wrapping around a back side of the rear conductor plate BM, it is not necessary to consider a distance between the vertically polarized wave antenna 5 and the rear conductor plate BM.

Figure 19:
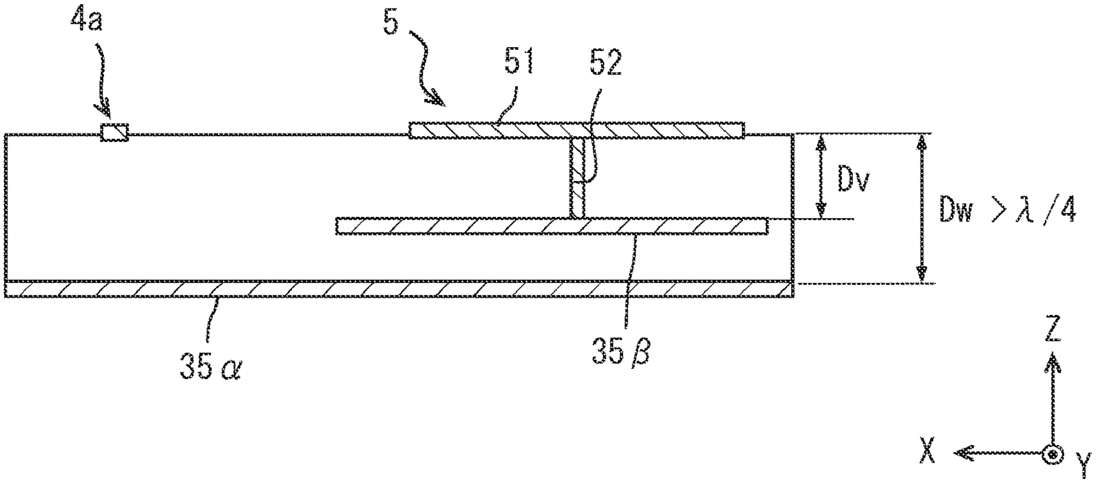
FIG. 19 is a view illustrating a modification of a configuration of a circuit board when a vehicle wireless device includes a vertically polarized wave antenna.

When the thickness of the circuit board 3 is an electrical distance of λ/4 or more, a ground pattern may also be formed in a portion overlapping the horizontally polarized wave antenna 4$x$ on the lower surface of the circuit board 3. When the thickness of the circuit board 3 is the electrical distance of λ/4 or more, for example, as illustrated in FIG. 19, a ground pattern 35β for the vertically polarized wave antenna 5 may be provided in a layer different from a ground pattern 35α for the horizontally polarized wave antenna 4$x$. The ground pattern 35α and the ground pattern 35β may be electrically connected by a buried via or a blind via (not illustrated). Dw illustrated in FIG. 19 indicates a distance from the upper surface to the lower surface of the circuit board 3, that is, the thickness of the circuit board 3, and has an electrical relationship of Dw>λ/4. Dv illustrated in FIG. 19 indicates an interval between the facing conductor plate 51 and the ground pattern 35β. The interval Dv may be set in a manner of forming the capacitance required for generating the LC parallel resonance at the target frequency.

In addition, the vertically polarized wave antenna 5 may be a monopole antenna that stands on the circuit board 3. Various antenna structures can also be adopted as the vertically polarized wave antenna 5. However, according to the configuration in which the zero-order resonance antenna is adopted as the vertically polarized wave antenna 5, there is an advantage that the height of the device can be restricted as compared with a configuration in which the monopole antenna or the like is used. The upright portion 41 of the three-dimensional antenna illustrated in FIG. 1 and the like can also be used as the vertically polarized wave antenna 5. The antenna 4 including the upright portion 41 and the board parallel portion 42 corresponds to an antenna that serves as both the vertically polarized wave antenna 5 and the horizontally polarized wave antenna 4$x$. The upright portion 41 also includes the first upright portion 41$a$.

The facing conductor plate 51 constituting the zero-order resonance antenna is designed in a manner of having an area that forms the inductance of the short-circuit portion 52 and the capacitance for performing the parallel resonance at a desired frequency (operation frequency). The facing conductor plate 51 is short-circuited to the ground pattern 35 at the short-circuit portion 52 provided in the central region of the facing conductor plate 51.

Therefore, when power at the operation frequency is input to the facing conductor plate 51 from the feeding point, the LC parallel resonance occurs due to energy exchange between an inductor and a capacitor, and an electric field perpendicular to the ground pattern 35 is generated between the ground pattern 35 and the facing conductor plate 51. That is, an electric field is generated in a Z-axis direction. A vertical electric field propagates from the short-circuit portion 52 toward the edge portion of the facing conductor plate 51, and is the board vertically polarized wave at the edge portion of the facing conductor plate 51 and propagates through a space.

Since a propagation direction of the vertical electric field generated by the LC parallel resonance is symmetrical about the short-circuit portion 52, the same level of gain is attained in all directions orthogonal to the short-circuit portion 52. In other words, one zero-order resonance antenna has directivity in all directions from the central region toward the edge portion of the facing conductor plate 51.

An operation when the antenna transmits (radiates) radio waves and an operation when the antenna receives the radio waves have mutual reversibility. Although the case of radio wave radiation has been described above as an example, it is possible to receive the board vertically polarized wave according to the above configuration.

Figure 20:
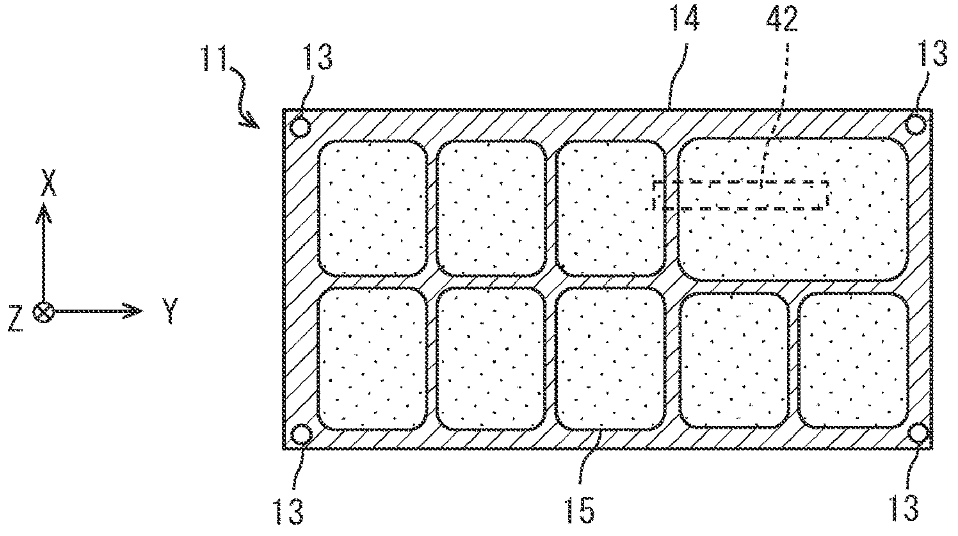
FIG. 20 is a view illustrating a modification of a configuration of a bottom.

As illustrated in FIG. 20, the lower case 1 may adopt a configuration in which a metal frame 14 is embedded inside a resin member. FIG. 20 is a schematic view illustrating an internal structure of the lower case 1. A reference numeral 15 illustrated in FIG. 20 denotes a resin with which a gap in the metal frame 14 is filled. The metal frame 14 is preferably configured in a manner of not overlapping a portion facing the horizontally polarized wave antenna 4$x$ such as the board parallel portion 42. In other words, the horizontally polarized wave antenna 4$x$ is preferably formed in a region of the circuit board 3 that overlaps a hole portion of the metal frame 14. As illustrated in FIG. 20, a part of the horizontally polarized wave antenna 4$x$ may overlap the metal frame 14.

Figure 21:
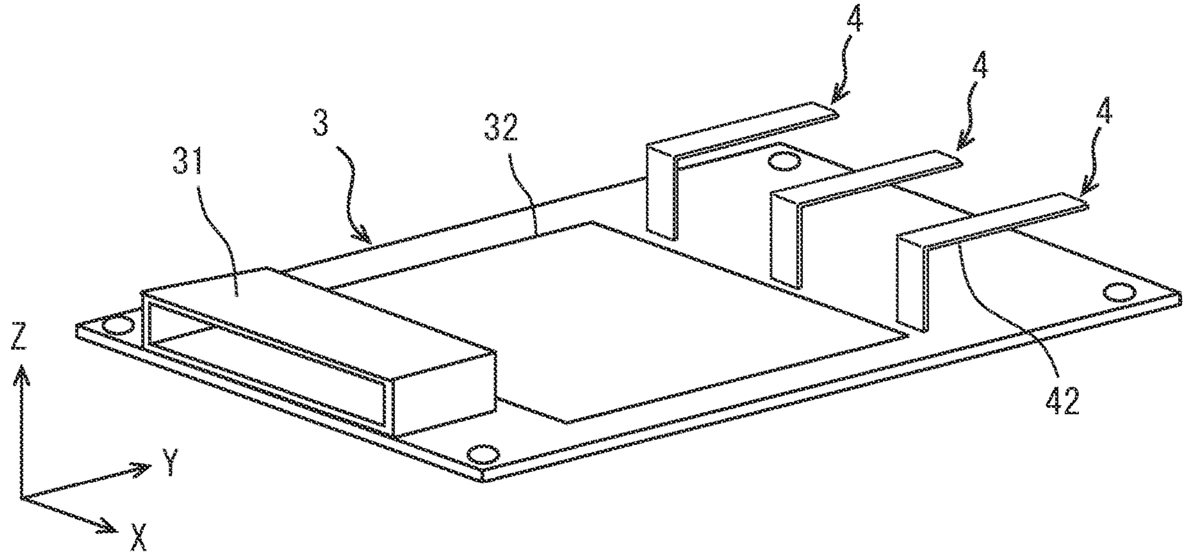
FIG. 21 is a view illustrating a configuration example in which multiple antennas are provided.
Figure 22:
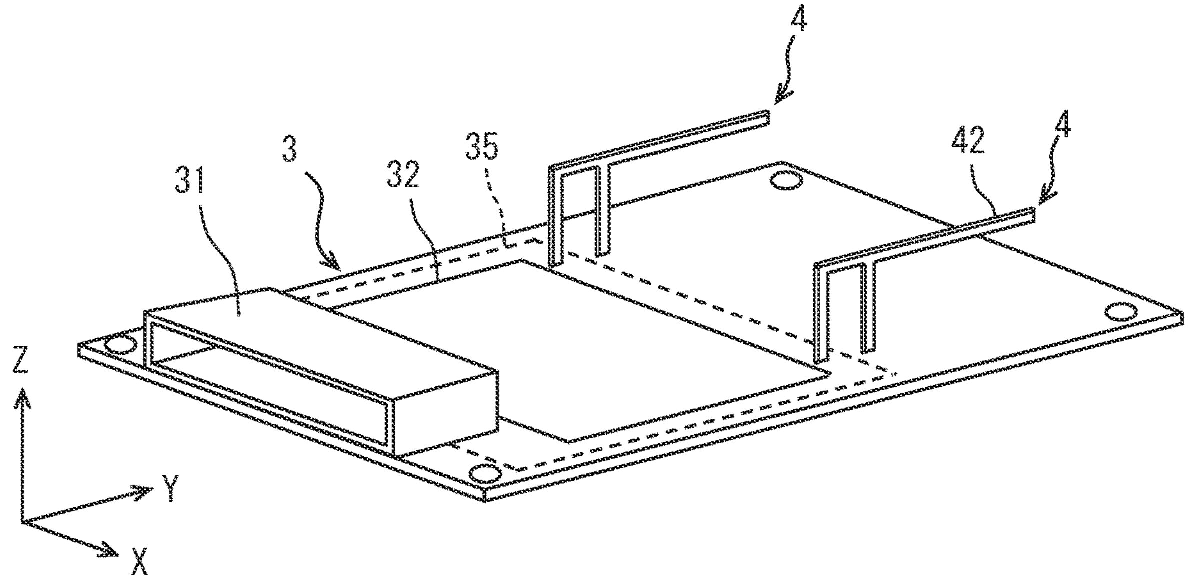
FIG. 22 is a view illustrating another configuration example in which multiple antennas are provided.

Although the configuration including one horizontally polarized wave antenna 4$x$ has been disclosed above, multiple horizontally polarized wave antennas 4$x$ may be provided. For example, as illustrated in FIGS. 21 and 22, multiple antennas 4 each including the board parallel portion 42 may be arranged in one row. The configuration illustrated in FIG. 21 corresponds to a configuration in which multiple (three) three-dimensional inverted-L antennas serving as the antennas 4 are arranged in an X-axis direction at predetermined intervals to function as an array antenna. The configuration illustrated in FIG. 22 corresponds to a configuration in which multiple (two) three-dimensional inverted-F antennas serving as the antennas 4 are arranged in the X-axis direction.

According to the configuration in which multiple horizontally polarized wave antennas 4$x$ are arranged, the horizontally polarized wave antennas 4$x$ can be operated as the array antenna. The horizontally polarized wave antenna 4$x$ is preferably configured such that radio waves travel in a direction in which the window portion 210 is present as much as possible when attached to the vehicle. In the array antenna, the directivity (beam) can be dynamically adjusted by adjusting a weighting factor for each antenna 4. Therefore, it is possible to direct the directivity in a direction from the vehicle wireless device 100 toward the window portion 210 by setting the weighting factor for each antenna 4 based on a positional relationship between the attachment target portion 200 and the window portion 210 or a test after or before attachment to the vehicle. As a result, it is possible to increase the amount of radio waves wrapping around the back side of the attachment target portion 200. The weighting factor may be referred to as a digital weight or an array factor. The weighting factor includes an amplitude coefficient for adjusting an amplitude and a phase coefficient for adjusting a phase. Various methods can be used as a method for adjusting the beam. Although the configuration in which multiple horizontally polarized wave antennas 4$x$ are arranged has been described above, multiple vertically polarized wave antennas 5 may also be provided.

The vehicle wireless device 100 is applicable to various vehicles traveling on a road. That is, the present disclosure can be applied to various vehicles capable of traveling on a road, such as a two-wheeled vehicle and a three-wheeled vehicle, in addition to a four-wheeled vehicle. A bicycle equipped with a prime mover can also be included in the two-wheeled vehicle. The vehicle to which the system or device or method or the like according to the present disclosure is applied may be an owner car owned by an individual, or may be a service car. The service car refers to, for example, a vehicle provided for a car-sharing service or a vehicle rental service. The service car includes a taxi, a route bus, a shared bus, or the like. The service car may be a robot taxi, an unmanned operation bus, or the like on which no driver is on board. The service car can widely include vehicles that provide mobile services. The service car can include a vehicle serving as an unmanned delivery robot that automatically transports a package to a predetermined destination.

Multiple functions possessed by one component in the above embodiments may be implemented by multiple components, or one function possessed by one component may be implemented by multiple components. Multiple functions possessed by multiple components may be implemented by one component, or one function implemented by multiple components may be implemented by one component. In addition, a part of the configuration according to the above embodiments may be omitted. At least a part of a configuration according to the above embodiments may be added to or replaced with a configuration according to another embodiment.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A vehicle wireless device configured to be attached to an attachment surface of a vehicle, the device comprising:
- a circuit board including a dielectric and a circuit configured to transmit or receive a radio wave at a predetermined target frequency of 700 MHz or more;
- a horizontally polarized wave antenna configured to receive the radio wave and including a board parallel portion parallel to the circuit board to receive a board horizontally polarized wave having a vibration direction of an electric field parallel to the circuit board; and
- a case accommodating the circuit board and the horizontally polarized wave antenna, wherein
- the circuit board is arranged such that the circuit board faces the attachment surface of the vehicle when the vehicle wireless device is attached to the attachment surface,
- the circuit board has a board region overlapping the board parallel portion without a ground portion being formed in the board region,
- the ground portion is a conductor plate configured to provide a ground potential for the circuit,
- a bottom of the case has a facing portion that faces the board parallel portion and at least the facing portion is made of resin,
- the board parallel portion is arranged such that the board parallel portion is at a distance of $\lambda/4$ or more from a vehicle body of the vehicle when the vehicle wireless device is attached to the attachment surface,
- $\lambda$ is a wavelength of the radio wave,
- a side surface of the case has a marker that is a line indicating a position of the board parallel portion provided within the case, and
- the board region of the circuit board and the bottom of the case face each other without a metal plate positioned between the board region and the bottom of the case.

2. The vehicle wireless device according to claim 1, wherein
- the antenna further includes an upright portion standing from the circuit board, and
- the antenna has a three-dimensional shape in which the board parallel portion is connected to the upright portion at an upper end portion of the upright portion.

3. The vehicle wireless device according to claim 2, wherein
- the antenna is an L-shaped antenna or an F-shaped antenna.

4. The vehicle wireless device according to claim 1, further comprising:
- a support portion made of resin having a predetermined thickness and disposed on an upper surface of the circuit board, wherein
- the board parallel portion is provided on a surface of the support portion or inside the support portion.

5. The vehicle wireless device according to claim 1, further comprising:
- a vertically polarized wave antenna configured to receive a board vertically polarized wave having a vibration direction of an electric field perpendicular to the circuit board.

6. The vehicle wireless device according to claim 5, wherein
- a lower surface or inside of the circuit board has a ground portion being a conductor plate configured to provide a ground potential for the circuit,
- the vertically polarized wave antenna includes
  - a facing conductor plate being a conductor member having a plate shape and provided at a predetermined interval from the ground portion, the facing conductor plate having a feeding point, and
  - a short-circuit portion provided in a central region of the facing conductor plate and configured to electrically connect the facing conductor plate and the ground portion, and
- the vertically polarized wave antenna is configured to create parallel resonance at the target frequency using an inductance of the short-circuit portion and a capacitance between the ground portion and the facing conductor plate.

7. The vehicle wireless device according to claim 1, wherein
- the horizontally polarized wave antenna is one of horizontally polarized wave antennas, and
- the horizontally polarized wave antennas are arranged in a predetermined direction.

8. A vehicle wireless device configured to be attached to an attachment surface of a vehicle, the device comprising:
- a circuit board including a dielectric and a circuit configured to transmit or receive a radio wave at a predetermined target frequency of 700 MHz or more;
- a horizontally polarized wave antenna configured to receive the radio wave and including a board parallel portion parallel to the circuit board to receive a board horizontally polarized wave having a vibration direction of an electric field parallel to the circuit board; and a case accommodating the circuit board and the horizontally polarized wave antenna, wherein the circuit board is arranged such that the circuit board faces the attachment surface of the vehicle when the vehicle wireless device is attached to the attachment surface, the circuit board has a board region overlapping the board parallel portion without a ground portion being formed in the board region, the ground portion is a conductor plate configured to provide a ground potential for the circuit, a bottom of the case has a facing portion that faces the board parallel portion and at least the facing portion is made of resin, the board parallel portion is arranged such that the board parallel portion is at a distance of λ/4 or more from a vehicle body of the vehicle when the vehicle wireless device is attached to the attachment surface, λ is a wavelength of the radio wave, a side surface of the case has a marker that is a line indicating a position of the board parallel portion provided within the case, the antenna further includes an upright portion standing from the circuit board, and the antenna has a three-dimensional shape in which the board parallel portion is connected to the upright portion at an upper end portion of the upright portion.

9. A vehicle wireless device configured to be attached to an attachment surface of a vehicle, the device comprising:

a circuit board including a dielectric and a circuit configured to transmit or receive a radio wave at a predetermined target frequency of 700 MHz or more;

a horizontally polarized wave antenna configured to receive the radio wave and including a board parallel portion parallel to the circuit board to receive a board horizontally polarized wave having a vibration direction of an electric field parallel to the circuit board;

a case accommodating the circuit board and the horizontally polarized wave antenna; and a vertically polarized wave antenna configured to receive a board vertically polarized wave having a vibration direction of an electric field perpendicular to the circuit board, wherein the circuit board is arranged such that the circuit board faces the attachment surface of the vehicle when the vehicle wireless device is attached to the attachment surface, the circuit board has a board region overlapping the board parallel portion without a ground portion being formed in the board region, the ground portion is a conductor plate configured to provide a ground potential for the circuit, a bottom of the case has a facing portion that faces the board parallel portion and at least the facing portion is made of resin, the board parallel portion is arranged such that the board parallel portion is at a distance of λ/4 or more from a vehicle body of the vehicle when the vehicle wireless device is attached to the attachment surface, λ is a wavelength of the radio wave, and a side surface of the case has a marker that is a line indicating a position of the board parallel portion provided within the case.

10. A vehicle wireless device configured to be attached to an attachment surface of a vehicle, the device comprising:

a circuit board including a dielectric and a circuit configured to transmit or receive a radio wave at a predetermined target frequency of 700 MHz or more;

a horizontally polarized wave antenna configured to receive the radio wave and including a board parallel portion parallel to the circuit board to receive a board horizontally polarized wave having a vibration direction of an electric field parallel to the circuit board; and a case accommodating the circuit board and the horizontally polarized wave antenna, wherein the circuit board is arranged such that the circuit board faces the attachment surface of the vehicle when the vehicle wireless device is attached to the attachment surface, the circuit board has a board region overlapping the board parallel portion without a ground portion being formed in the board region, the ground portion is a conductor plate configured to provide a ground potential for the circuit, a bottom of the case has a facing portion that faces the board parallel portion and at least the facing portion is made of resin, the board parallel portion is arranged such that the board parallel portion is at a distance of λ/4 or more from a vehicle body of the vehicle when the vehicle wireless device is attached to the attachment surface, λ is a wavelength of the radio wave, a side surface of the case has a marker that is a line indicating a position of the board parallel portion provided within the case, the horizontally polarized wave antenna is one of horizontally polarized wave antennas, and the horizontally polarized wave antennas are arranged in a predetermined direction.

* * * * *